United States Patent [19]

Ham et al.

[11] 4,172,027

[45] Oct. 23, 1979

[54] CATALYTIC PROCESS FOR REFORMING OR PRODUCTION OF AROMATIC HYDROCARBONS

[75] Inventors: Pierre Ham, La Celle Saint Cloud; Roland Huin, Montesson la Borde, both of France

[73] Assignee: Institut Francais du Petrole, Rueil-Malmaison, France

[21] Appl. No.: 873,989

[22] Filed: Jan. 31, 1978

[30] Foreign Application Priority Data

| Jan. 31, 1977 | [FR] | France | 77 02815 |
| Feb. 9, 1977 | [FR] | France | 77 03834 |
| Feb. 22, 1977 | [FR] | France | 77 05343 |
| Feb. 23, 1977 | [FR] | France | 77 05876 |
| Apr. 15, 1977 | [FR] | France | 77 11643 |

[51] Int. Cl.$^2$ .................................... C10G 35/08
[52] U.S. Cl. .................... 208/140; 208/139; 252/411 R; 585/412
[58] Field of Search .................. 208/139, 140; 252/411 R

[56] References Cited

U.S. PATENT DOCUMENTS

| 3,898,173 | 8/1975 | Hayes | 208/140 |
| 3,935,244 | 1/1976 | Hayes | 208/140 |

Primary Examiner—C. Davis
Attorney, Agent, or Firm—Millen & White

[57] ABSTRACT

Catalytic process for reforming or production of aromatic hydrocarbons at a temperature from 480° to 600° C., wherein a charge of hydrocarbons and hydrogen is passed through two reaction zones, of the moving bed type, whose catalyst continuously flows downwardly and is withdrawn at the bottom thereof, is regenerated, treated with hydrogen and then with a sulfur compound, at respective temperatures lower than the reaction temperature, and thereafter fed back continuously to the reaction zone.

30 Claims, 8 Drawing Figures

CATALYTIC PROCESS FOR REFORMING OR PRODUCTION OF AROMATIC HYDROCARBONS

The invention concerns a continuous process for the conversion of hydrocarbons, in the presence of a catalyst, at a temperature from 480° to 600° C., wherein an initial charge, consisting of hydrocarbons and hydrogen, is passed through at least two reaction zones of the moving bed type; the catalyst circulates as a moving bed through the reaction zone by flowing continuously downwardly in said zone; the catalyst is then continuously withdrawn from the bottom of the reaction zone and transferred to the regeneration zone; the process is remarkable in that:

(a) the regenerated catalyst is downwardly transferred to a hydrogen treatment zone, separate from the reaction zone, where it is treated with hydrogen at a temperature lower than the reaction temperature, (b) the catalyst, after this treatment with hydrogen, is continuously transferred to a sulfiding zone, separate from the hydrotreatment zone and from the reaction zone, wherein it is treated with a sulfur compound at a temperature lower than the temperature prevailing in the reaction zone, (c) the catalyst, after treatment with a sulfur compound, continuously flows towards the reaction zone.

It is an object of the invention to provide a process wherein the catalyst after regeneration, is subjected to hydrotreatment and then to sulfiding in two separate zones, clearly remote from the reaction zone; this process thus provides for the hydrotreatment and the sulfiding at moderate and ideal temperatures, much lower than the temperatures used in the prior art; as a matter of fact, in the prior art, the temperature for the hydrotreatment and the sulfiding were practically imposed by the temperature in the reaction zone since the hydrotreatment and sulfiding zones were placed in the immediate vicinity of the reaction zone.

The present invention concerns a process for hydrocarbon hydroreforming; it also concerns the production of aromatic hydrocarbons, for example the production of benzene, toluene and xylenes (ortho, meta or para), either from saturated or unsaturated gasolines (for example pyrolysis gasolines from cracking units, particularly steam cracking units, or from catalytic reforming units), or even from naphthenic hydrocarbons convertible into aromatic hydrocarbons by dehydrogenation.

In the present process, at least two reactors or reaction zones are used to perform the reforming reactions or the reactions of aromatic hydrocarbon production, but preferably there is used, for example, three or four reactors or reaction zones; each of the reactors contains a moving bed catalyst.

The charge circulates successively in each reactor or reaction zone by axial or radial flow (i.e. from the center to the periphery or from the periphery to the center). The reaction zones are arranged in series, for example side by side, or superposed, so that the charge flows successively through each of the reaction zones with intermediary heating of the charge between the reaction zones; fresh catalyst is introduced at the top of the first reaction zone where the fresh charge is introduced; then it flows continuously downwardly in said zone wherefrom it is continuously withdrawn from the bottom; then, by any convenient means (particularly lifting means), it is transferred to the top of the next reaction zone wherein it also flows continuously downwardly, and so on, up to the last reaction zone wherefrom the catalyst is also continuously withdrawn and transferred to a regeneration zone.

The reaction zones are preferably placed side by side.

The catalyst circulation from the bottom of the reaction zone to the top of the next reaction zone, from the bottom of the last reaction zone to the regeneration zone and optionally from the bottom of the regeneration zone to the top of the first reaction zone, is performed by means of any known lifting device which, in the following specification and claims, will be referred to as "lift". The lift fluid used for conveying the catalyst may be any convenient gas, for example nitrogen or even pure or purified hydrogen or still the hydrogen produced in the unit.

The solid material moving from a reaction zone to another reaction zone and towards the regeneration zone may, for example, consist of a granular catalyst. This catalyst may be, for example, in the form of spherical balls of a diameter from 1 to 3 millimeters, preferably from 1.5 to 2 millimeters, although these values are not limitative. The bulk specific gravity of the catalyst is usually from 0.4 to 1, preferably from 0.5 to 0.9 and more particularly from 0.55 to 0.8, these values being not limitative.

The reactions which can be performed by the process of the invention have been mentioned at the beginning of this specification and may be substantially divided in two groups:

(1) on the one hand, the reforming reactions.

The general conditions of catalytic hydroreforming reactions are as follows: in each reaction zone, the average temperature is about 480°–600° C., the pressure about 5–20 kg/cm$^2$, the hourly space velocity from 0.5 to 10 volumes of liquid naphtha per volume of catalyst and the recycling rate from 1 to 10 moles of hydrogen per mole of charge.

The charge may consist for example of a naphtha distilling between about 60° C. and about 220° C., particularly a straight run naphtha. The catalyst may, for example, comprise at least one metal from the platinum family i.e. a noble metal such as platinum, palladium, iridium, rhodium, ruthenium, osmium, deposited on an alumina carrier or an equivalent compound (examples: platinum-alumina-halogen or platinum-iridium-alumina-halogen). The total content of noble metals is from 0.1 to 2% by weight with respect to the catalyst and the content of halogen, preferably chlorine or fluorine, from 0.1 to 10%. The association alumina-halogen may be replaced by other carriers, for example silica-alumina. The catalyst may contain at least one other metal promoter selected from any group of the periodic classification of elements.

(2) on the other hand the reaction for the production of aromatic hydrocarbons from saturated or unsaturated gasolines (so-called "Aromizing" reactions).

In the case of an unsaturated charge, i.e. a charge containing diolefins and monoolefins, this charge must first be made free thereof by either selective or total hydrogenation. Then, the charge, optionally freed by hydrogenation of substantially all diolefins and monoolefins contained therein, is subjected, in each reaction zone, to a reaction for the production of aromatic hydrocarbons in the presence of hydrogen and of a catalyst containing an acid carrier and at least one metal, for example, noble metal from grop VIII (platinum family) and/or also at least one metal promoter, conveniently selected in the periodic classification of elements, at a temperature from about 500° to 600° C. or from 520° to 600° C., under a pressure from 1 to 60 kg/cm², the hourly flow rate by volume of the liquid charge being from 0.1 to 10 times the catalyst volume, the molar ratio hydrogen/hydrocarbons being about 0.5-20.

As concerns the regeneration of the catalyst itself, it can be achieved by any known means. Preferably, the catalyst is:

(a) subjected to a combustion step by means of a gas containing molecular oxygen;

(b) subjected to oxychlorination by means of a gas containing molecular oxygen and simultaneously by means of at least one halogen or halogenated compound, for example a hydrogen halide or an alkyl halide;

(c) subjected to a final treatment with a gas containing molecular oxygen.

These three treatments are performed either successively in a single zone with a fixed bed, or in an enclosed space with a moving bed, the catalyst moving successively in three separate zones where are performed each of the three regeneration steps.

The regeneration is followed by a cleansing step, for example with nitrogen, to remove from the catalyst any trace of residual gaseous oxygen.

In the prior art, the regenerated catalyst, before its introduction into the first reaction zone, is subjected to a reduction step, i.e. to a treatment with hydrogen, in order to reduce certain oxides, particularly metal oxides, present in the catalyst.

In the prior art, when proceeding in moving bed reaction zones, said reaction is performed at the head of the reactor, inside the reactor itself or close to the reactor head. The heating of the reduction zone is performed by the heating means of the reactor itself and particularly by indirect contact with the hot charge to be treated. Once the reduction performed, the catalyst is introduced into the reaction zone itself.

Also, in the prior art, the regenerated and reduced catalyst is generally subjected, before being introduced into the reaction zone itself, to a sulfiding step, during which substantially all the metals of the catalyst are sulfided. The sulfiding reaction is performed at the top of the reactor either in the same zone as that in which is conducted the reduction step or in a zone just below the reduction zone. In the sulfiding zone the operation is conducted according to the prior art, at a temperature which is imposed by the temperature of the reduction step, i.e. from 480° to 600° C.

The sulfiding agent is either hydrogen sulfide in a pure state or diluted with gaseous hydrocarbons, or dimethyldisulfide diluted with hydrogen or any other sulfided compound such as alkyl sulfides or alkyl mercaptans diluted with hydrogen. The pressure will be that prevailing in the reactor wherein the reforming or aromatic hydrocarbon production is conducted, the duration of the sulfiding step varying from a few minutes to a few days according to the selected operating conditions.

BRIEF DESCRIPTION OF DRAWINGS

In FIGS. 1 and 2, the reduction and sulfurization of the catalyst are performed in the reactors.

Figure 1:
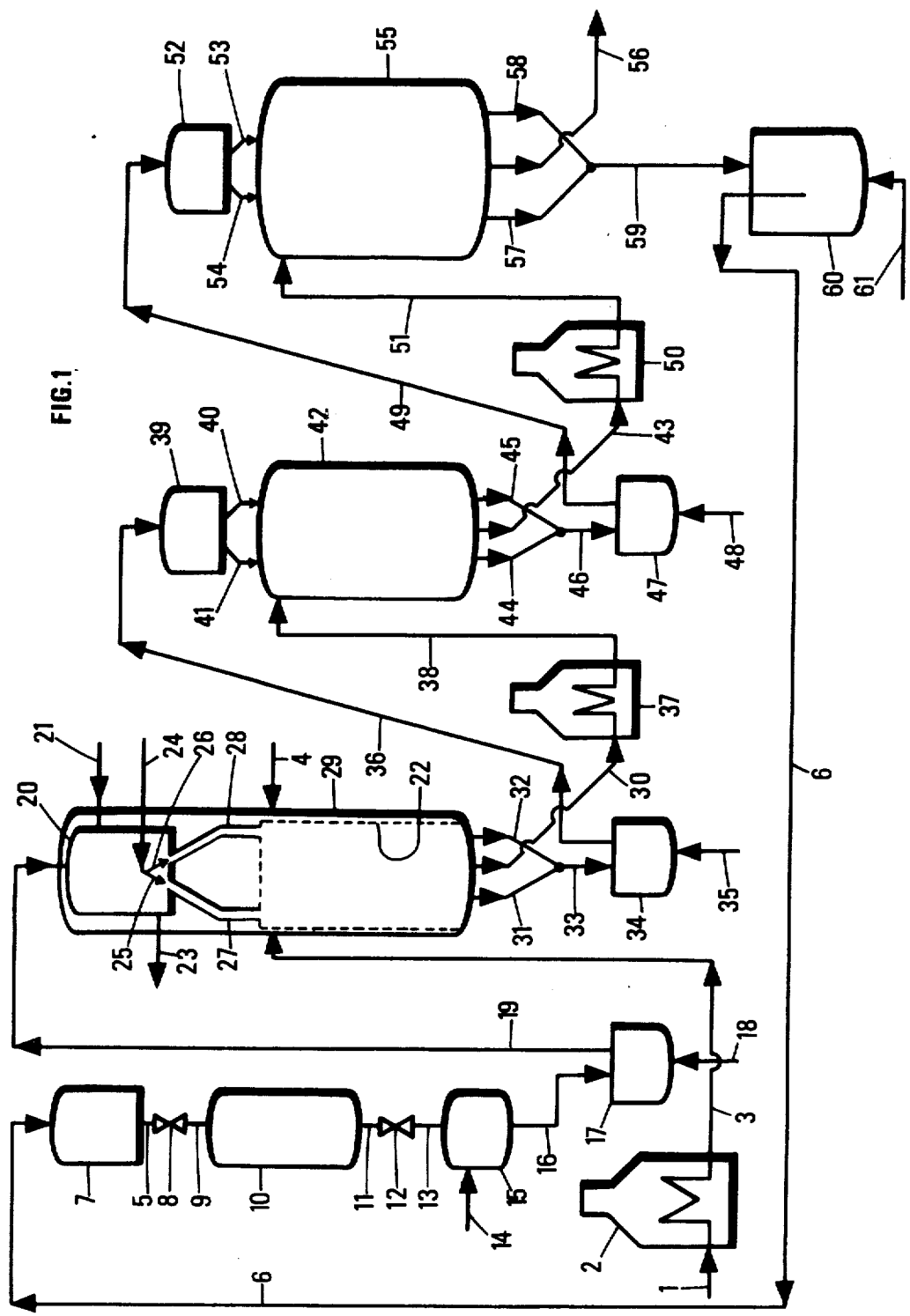
FIG. 1, which forms no part of the invention, illustrates a prior art process of three reactors and a catalyst regeneration system.

The charge is introduced through line 1, furnace 2 and line 3 into the first reactor 29. The effluent from the first reactor is withdrawn through line 30 and then fed through furnace 37 and line 38 to the second reactor 42. The effluent from the second reactor is withdrawn through line 43 and fed, through furnace 50 and line 51, to the third reactor 55. The effluent from the third reactor is withdrawn through line 56. Fresh catalyst, at the starting of the run, is introduced into the first reactor 29, for example through line 4. The regenerated catalyst is fed to reactor 29 through line or lift 19.

The catalyst moves inside reactor 29 through lines 27 and 28, then through reactor 29 itself, as a moving bed. The catalyst is withdrawn from reactor 29 through a plurality of lines such as 31 and 32 and through line 33 through which it reaches the lift pot 34. The withdrawal is performed either periodically through any convenient system of valves or equivalent system, or continuously without valve system, the regulation of the catalyst flow rate being performed through a convenient conventional adjustment by means of hydrogen either pure or from the unit, injected through a line, not shown on the figure, at the level of apparatus 34.

A sufficient amount of gas from the unit is fed to prevent a portion of the reaction effluent from being carried away with the catalyst particles. The catalyst is then driven from the lift pot 34 towards the second reactor 42, by any known lifting means, referred to in the specification as "lift". The lift fluid is advantageously recycle hydrogen or the hydrogen produced by the unit, introduced through line 35. The catalyst so driven, through lift 36, reaches vessel 39 wherefrom, through a plurality of lines such as 40 and 41, it reaches the second reactor 42 (Vessel 39 and lines 40 and 41 may optionally be integral with reactor 42). The catalyst passes through reactor 42 as a moving bed, is withdrawn therefrom, as in the case of the first reactor 29, through a plurality of lines such as 44 and 45, and reaches the lift pot 47 through duct 46.

Through lift 49, fed for example with recycle hydrogen through line 48, the catalyst reaches vessel 52 wherefrom, through a plurality of lines such as 53 and 54, it reaches the third moving bed reactor 55. The catalyst is withdrawn from the third reactor 55 in the same manner as from the first and second reactors 29 and 42, through a plurality of lines 57 and 58; the used catalyst reaches the lift pot 60 through line 59. The used catalyst is then fed to an "accumulator-decanter" vessel 7, through lift 6, fed for example with recycle hydrogen introduced, through line 61, into lift pot 60. The used catalyst reaches, through the valve system 8 and lines 5 and 9, the regeneration zone 10. After the regeneration of the catalyst has been performed and the regenerated catalyst has been purged for removing molecular oxygen, (the various feeding lines required for the regeneration and the purge are conventional and need not to be shown here), the regenerated catalyst is fed, through lines 11 and 13 and the valve system 12, to the receiving vessel 15 where optionally, this regenerated catalyst is scavenged by a stream of pure hydrogen, introduced through line 14, so as to maintain in the vessel 15 a slight overpressure with respect to the lift pot 17. The catalyst withdrawn from vessel 15 through line 16 reaches the lift pot 17, wherefrom it is carried along with pure hydrogen, introduced through line 18, into the lift 19 towards a reduction zone 20 located at the upper internal portion of the first reactor 29. This reduction zone is optionally fed with pure hydrogen, introduced through line 21, when pure hydrogen of lift 19 is insufficient to perform the reduction of the catalyst. The catalyst flows through zone 20, is then withdrawn from the reduction zone 20 through a plurality of lines such as 27 and 28. In these lines or "legs" 27 and 28, the catalyst can be sulfided by means of a gas containing a sulfur compound and, optionally, pure hydrogen used as the sulfur compound-carrying gas. This sulfurized gas is introduced into lines 27 and 28 through lines 24, 25 and 26. In these lines or legs 27 and 28, the gas is very turbulent, thereby ensuring a good sulfiding reaction. Lines 27 and 28 are being generally rather encumbered by the catalyst, the sulfurized gas and the hydrogen excess of lines 18, 19 and 21, it may be necessary to discharge the excess of pure hydrogen through discharge line 23. The reduced and sulfurized regenerated catalyst is then introduced into the catalyst zone 22 itself, through lines 27 and 28.

In the case of said FIG. 1, as the reduction and the sulfiding are performed at the top of the first reactor, in the internal upper part thereof, the reduction and sulfiding temperatures are accordingly imposed by the temperature of the reactor itself, i.e. by the reforming temperature (equal to or higher than 480° C.) or by the temperature of aromatic hydrocarbon production (preferably equal to or higher than 520° C.). Since the reactor has a very high thermal inertia, it follows therefrom that there is no means at all to quickly vary the temperature in the upper portion of the first reaction zone. Accordingly, it is not possible to correctly adjust either the reduction or the sulfurization temperature, these temperatures being practically equal to that at which the reactions of reforming or aromatic hydrocarbon production are performed. The process conforming to FIG. 1 is, accordingly, unfavourable, the more as it has been observed, in particular, that the sulfurization reaction should be preferably performed at a moderate temperature, for example from 300° to 390° C.; it has therefore been recently proposed, in the French patent specification No. 77/01,841, an arrangement shown in FIG. 2, not conforming with the invention, wherein both reactions of reduction and sulfurization are performed, on the one hand, separately and, on the other hand, outside the reactor. The process illustrated by FIG. 2 makes also use of three reactors. The charge is introduced through line 1, oven 2 and lines 3 and 4, into the first reactor 29. The effluent from the first reactor 29 is withdrawn through line 30 and fed, through furnace 37 and line 38, to the second reactor 42. The effluent from the second reactor is withdrawn through line 43 and fed, through furnace 50 and line 51, to the third reactor 55. The final effluent is withdrawn from the third reactor 55 through line 56. Fresh catalyst, when starting the unit, is introduced into the first reactor 29 through a line, not shown on FIG. 2. The regenerated catalyst is fed to the first reactor 29 through line or lift 19 as well as through a plurality of lines such as 27 and 28. The catalyst progresses through lines 27 and 28, on the one hand, and in reactor 29, on the other hand, as a moving bed. The catalyst progresses through the three reactors of FIG. 2 exactly as indicated on FIG. 1. Thus the catalyst successively circulates through lines 31 and 32, line 33, lift pot 34 and lift 36. The fluid from lift 36 is introduced through line 35. The catalyst thus reaches the second reactor 42 through a plurality of lines 40 and 41, passes through reactor 42, is withdrawn from said reactor through lines 44 and 45, and reaches the lift pot 47 through line 46. Through lift 49, whose carrying fluid is introduced from line 48, the catalyst reaches vessel 52, progresses through lines 53 and 54, into reactor 55 and in lines 57, 58 and then 59. The used catalyst, so withdrawn through line 59 of the third reactor 56, reaches the lift pot 60 wherefrom it is conveyed, through lift 6, fed for example with recycle hydrogen introduced through line 61, to the accumulator-decanter vessel 7.

The used catalyst then reaches, through the valve system 8 and line 9, the regeneration zone 10. The catalyst, after regeneration and purging thereof for removing molecular oxygen, is fed, exactly as according to FIG. 1, to the reduction zone 20. The various feed lines necessary for the regeneration and the purge are conventional and are not shown on the drawings; the regenerated catalyst circulates through lines 11 and 13, the valve system 12 and the receiver 15, said receiver being optionally scavenged with a stream of pure hydrogen, introduced through line 14; The catalyst withdrawn from vessel 15, through line 16, reaches the lift pot 17, wherefrom it is carried along with the pure hydrogen introduced through line 18, into lift 19. The catalyst thus reaches the reduction zone 20. The difference with the case of FIG. 1 is that, in the case of FIG. 2, zone 20 is not located at the upper internal portion of reactor 29 but above said reactor 29. Said reduction zone 29 is optionally fed with pure hydrogen introduced through line 21 when the pure hydrogen of lift 19 is insufficient to perform said reduction. This reduction zone is heated for example by indirect contact with a portion of the charge, through the intermediary of lines 5 and 22 (this diverted portion of the charge used for heating zone 20 is then generally fed directly to one of reactors 42 and 55).

The catalyst is then withdrawn from the reduction zone 20 through a plurality of lines such as 27 and 28. It is in these lines or "legs" 27 and 28 that is performed, outside reactor 29, the sulfurization of the catalyst by means of a sulfur compound (optionally carried by pure hydrogen). This sulfurized gas is introduced into lines 27 and 28 through lines 24, 25 and 26. The hydrogen excess may be withdrawn through line 23. The catalyst then enters reactor 29.

Figure 2:
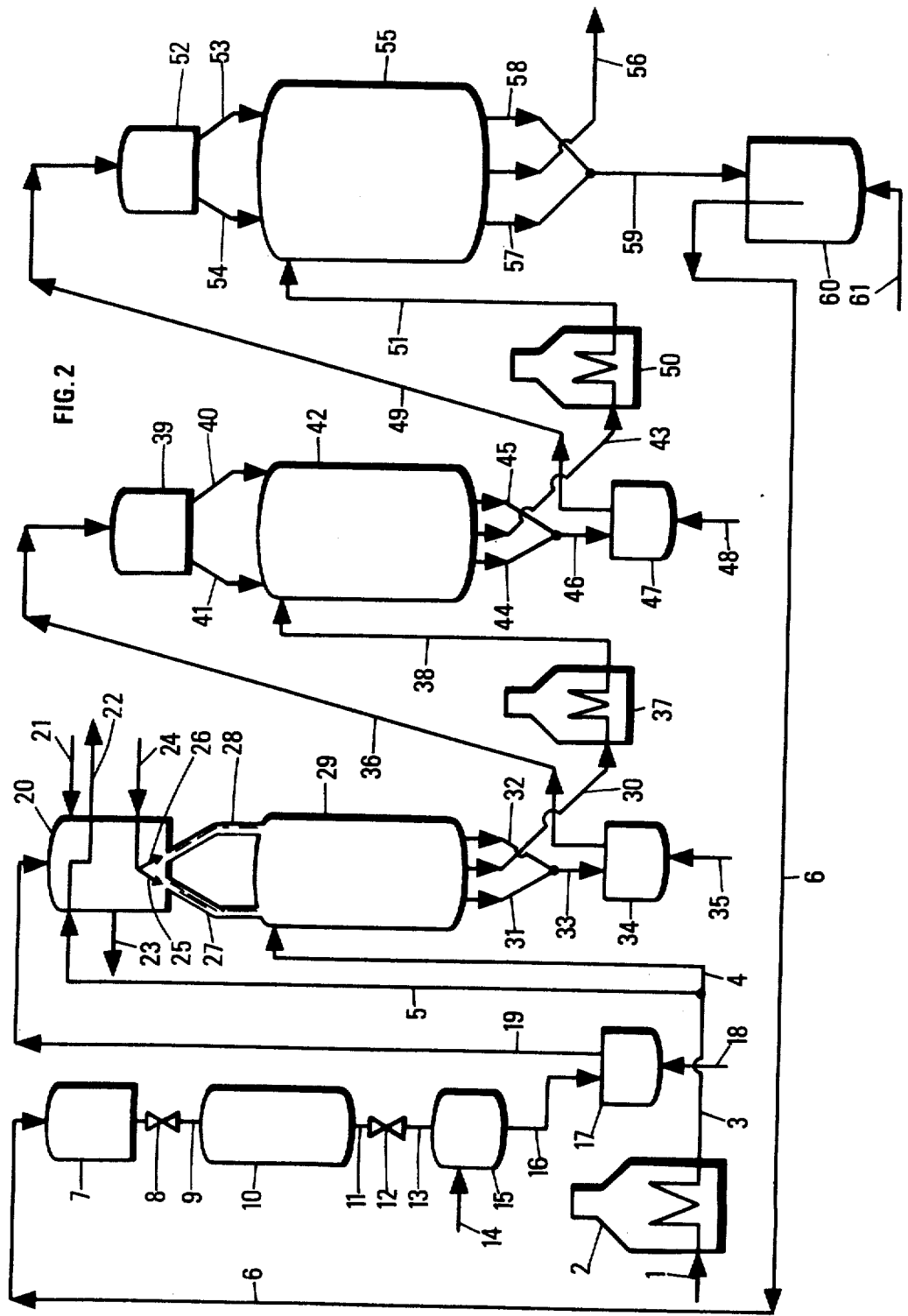
FIG. 2 shows an alternative embodiment to that of FIG. 1.

The system shown in FIG. 2 makes possible to perform the reduction at a temperature slightly lower than in the case of FIG. 1; but the reduction temperature is still too high and generally higher than 530° C. since the reactions of reforming and aromatic hydrocarbon production require, in most cases, temperatures of at least 540° C. and the system of FIG. 2 is no more than an alternative embodiment of that of FIG. 1. Due to the high reduction temperature, and the high temperature in the reaction zone, the system of FIG. 2 does not make possible the use of a temperature substantially lower than in the case of FIG. 1, by omitting the heat insulation of legs 27 and 28; accordingly this sulfurization temperature is still practically as high as in the case of FIG. 1 where said sulfurization temperature is imposed by the temperature of the reactor. Accordingly, the system of FIG. 2 is not satisfactory, since the following major drawbacks of the system of FIG. 1 are still maintained:

First of all, each reaction zone has a very high thermal inertia, so that, for example, there is no means to quickly vary the temperature of the upper portion (20 on FIGS. 1 and 2) of the first reaction zone, even when, as in the case of FIG. 2, this portion 20 is managed outside reactor 29. Practically, it is thus not possible, in the case of FIG. 2, to correctly adjust either the reduction temperature or the sulfurization temperature, these temperatures being thus substantially equal to that at which are performed the reactions of reforming or aromatic hydrocarbons production.

Subsequently, due to the thermal inertia of the upper portion of reactor 29 and to the vicinity of said reactor, the sulfurization temperature is in fact always that at which is performed the reduction i.e. higher than 480° C. On the contrary, it should be preferable that the sulfurization temperature be lower than about 400° C. in order to obtain a more efficient sulfurization, i.e. that the sulfur be better fixed on the metals of the catalyst. An ideal sulfurization temperature will be a temperature lower than 390° C. or even lower than 380° C.

Finally, in the systems shown in FIGS. 1 and 2, the security conditions are insufficient; as a matter of fact, the purge of the catalyst with nitrogen which follows the catalyst regeneration, is intended to remove all the gaseous oxygen involved in the regeneration and to avoid any risk of explosion in the reduction zone. But if, for any unknown reason, such as an overpressure or an accidental leakage, such an explosion occured, it would immediately propagate through the sulfurization zone and that zone where is conducted the reaction of reforming or of aromatic hydrocarbon production, since the reduction, sulfurization and reaction zones are very close to one another.

The present process according to this invention meets with these difficulties. In the present process, the reduction and sulfurization zones, on the one hand, are separate from each other and, on the other hand, are located clearly apart from the first reactor.

Figure 3:
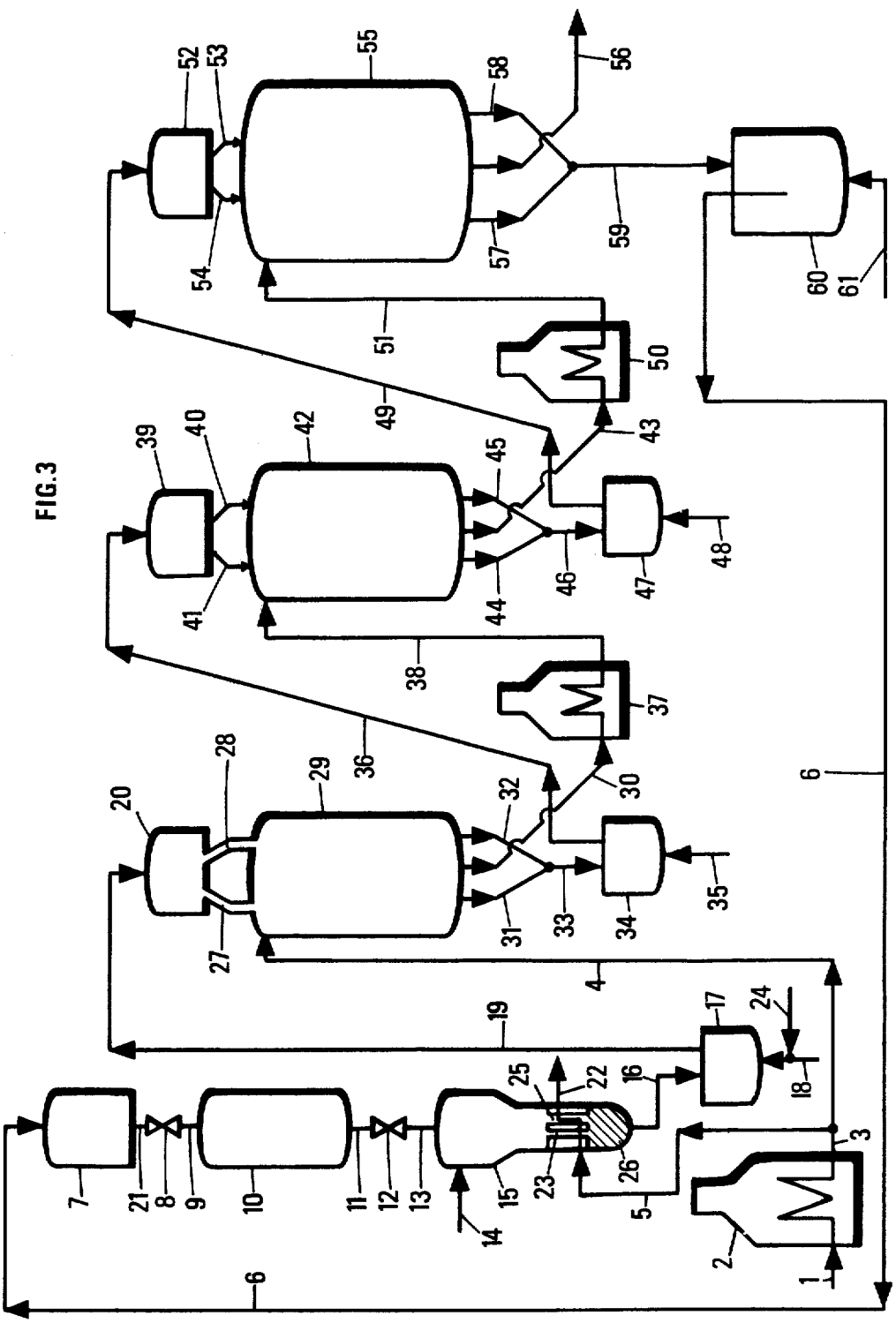
FIG. 3, according to the invention, provides a system of three reactors and further provides for reduction and sulfurization of the catalyst prior to its introduction into the first reactor.

Various arrangements may possibly be used to perform the process of the invention. FIG. 3 illustrates a first means for carrying out the invention. The process illustrated by FIG. 3 thus makes it possible to reduce the catalyst at an ideal temperature, lower than the reaction temperature and in the range from 480° and 530° C. or from 480° and 520° C. and to perform the sulfurization of the catalyst at an ideal temperature lower, by at least 80° C., than the reduction temperature, said temperature being from 150° C. to 400° C., preferably from 280° to 390° C. and more particularly from 300° to 370° C.

The process illustrated by said figure makes use of three reactors as in the case of FIGS. 1 and 2. The charge is introduced through line 1, furnace 2 and lines 3 and 4, into the first reactor 29. The effluent from the first reactor is withdrawn through line 30 and fed, through furnace 37 and line 38, to the second reactor 42. The effluent from the second reactor is withdrawn through line 43 and fed, through furnace 50 and line 51, to the third reactor 55. The effluent from the third reactor is withdrawn through line 56. Fresh catalyst, at the starting of the unit, is introduced into the first reactor 29 through a line, not shown in the FIG. 3. The catalyst discharged from the regeneration zone 10 enters the first reactor 29 through line or lift 19 as well as through a plurality of lines such as 27 and 28. The catalyst progresses in reactor 29 as a moving bed. The catalyst is withdrawn from reactor 29 through a plurality of lines such as 31 and 32 and through line 33 leading to the lift pot 34. This withdrawal is performed continuously (a valve system is not required), the regulation of the catalyst flow rate being performed through convenient conventional regulating means with hydrogen (pure hydrogen or hydrogen from the unit) injected through a line, not shown on the figure, at the level of apparatus 34.

Sufficient gas of the unit is fed to prevent the carrying away of a portion of the reaction effluent with the catalyst particles. The catalyst is then driven from the lift pot 34 to the second reactor 42, by any known lifting device, which in this specification, is called "lift". The lift fluid is advantageously recycle hydrogen or hydrogen produced by the unit, introduced through line 35. The catalyst thus driven in lift 36 reaches vessel 39 wherefrom, through a plurality of lines such as 40 and 41, it reaches the second reactor 42 (vessel 39 and lines 40 and 41 may optionally be integral with reactor 42 i.e. may be arranged inside the reactor itself). The catalyst passes through reactor 42 as a moving bed, is withdrawn from said reactor continuously as in the case of the first reactor 29, through a plurality of lines such as 44 and 45 and reaches the lift pot 47 through line 46.

Through lift 49, fed for example with recycle hydrogen through line 48, the catalyst reaches vessel 52 wherefrom, through a plurality of lines such as 53 and 54, it reaches the third moving bed reactor 55. The catalyst is continuously withdrawn from the third reactor 55 as in the case of the first and second reactors 29 and 42, through a plurality of lines 57 and 58; the used catalyst reaches the lift pot 60 through line 59. This used catalyst is then fed to an "accumulator-decanter" vessel 7 through lift 6 fed, for example, with recycle hydrogen introduced through line 61 in lift pot 60. The used catalyst reaches, through the valve system 8 and lines 21 and 9, the regeneration zone 10. Once the catalyst has been regenerated and purged so as to remove molecular oxygen therefrom, (the various feed lines required for the regeneration and the purge being conventional are not shown on the drawings), this regenerated catalyst is periodically or continuously conveyed, through lines 11 and 13 and the optional valve system 12, to the upper portion of an enclosure 15 wherein is introduced pure hydrogen through line 14. The catalyst progresses, for example through lines 23 and 25, towards the lower portion (zone 26) of enclosure 15; in lines 23 and 25 and in zone 26, the regenerated catalyst is reduced by means of pure hydrogen introduced through line 14. The excess of pure hydrogen may be withdrawn through a line, not shown on the figure, at the bottom of zone 26. This reduction is performed at the exact desired temperature, for example 500° C., zone 26 being heated by any convenient means, for example either by indirect contact with a portion of the charge (through the intermediary of lines 5 and 22) or with a reaction effluent from line 56. The diverted portion of the charge (line 5) which has been used for heating zone 26 may then be directly fed to one of the two reactors 42 and 55. The portion of the charge so diverted towards line 5, or the portion of the effluent from line 56, amounts advantageously to 1 to 5% by weight of the total initial charge of line 1 or of the total effluent of line 56.

The regenerated and reduced catalyst is withdrawn from enclosure 15 through line 16 and reaches the lift pot 17, wherefrom it is carried along with pure hydrogen introduced through line 18, in lift 19, towards a receiver 20 located, as shown on FIG. 3, above the first reactor 29. From this receiver 20, the catalyst then flows down continuously as a moving bed through a plurality of lines or "legs" such as 27 and 28 towards the first reactor 29.

Sulfiding, which is performed after the hydrogenation of the regenerated catalyst, is conducted partly in lift pot 17 and partly in lift 19, optionally also partly in receiver 20 and in legs 27 and 28. The sulfur compound, and optionally pure hydrogen used as carrying gas for the sulfur compound, is introduced in lift pot 17, through line 24. When proceeding according to the invention, sulfiding is conducted at the selected ideal temperature.

The progress of the catalyst, after its flowing out from zone 15 and in zones 17, 20, in lift 19 and in the transfer lines 27 and 28, must necessarily be performed continuously in order to ensure a good regulation of the reduction and sulfiding temperatures and to avoid that the catalyst be subjected to abrupt temperature variations which, over a long period, would result in a premature loss of stability of the catalyst.

The arrangement of FIG. 3 thus offers various advantages over the processes of the prior art:

The heating system for the various parts 23, 25 and 26 of the reduction zone and the heating system for the sulfurization zone (17, 19 and optionally 20, 27 and 28) are completely independent there between, on the one hand, and independent from the heating system of the first reactor 29, on the other hand. Thermal inertia no longer exists in these two reduction and sulfurization zones and it is possible to easily and separately regulate the temperatures of the reduction zone (for example by means of the diversion 5 of a portion of the charge) and of the sulfurization zone, to the desired values. In particular, the reduction temperature may be adjusted at the exact optimum value, usually comprised between 480° and 530° C. In addition, in the process of the prior art, it was impossible to lower the temperature of the sulfurization zone, since said zone was located between two hot zones, that of the reduction zone and that of the reactor. On the contrary, in the present case, it becomes particularly easy to achieve the sulfurization at a temperature lower by at least 80° C. than the reduction temperature, and below 400° C., for example between 150° and 400° C., preferably from 280° to 380° C., more particularly between 300° and 370° C.; it suffices, for example, for lowering the temperature, which was for example of about 500° C. in the upstream zone 26, not to heat the lift pot 17 or to make use of a convenient heat-insulation (or absence of heat-insulation) of said lift pot 17 and of line 16 and/or lift 19 and/or legs 27 and 28. It is also possible to adjust the sulfurization temperature by acting, not only on the thermal losses of line 16, lift pot or lift itself or legs 27 and 28, but also by acting completely or partly on the temperature of the pure hydrogen introduced through line 18, as carrying gas, into lift 19.

It is also possible to proceed to a perfect heat-insulation of the lift and obtain the desired temperature in said lift where occurs desulfurization, by adjusting the hydrogen temperature in line 18.

The process of the invention offers many other advantages:

In the present process of the invention, when, by accident, traces of oxygen are still present in the regenerated catalyst, in spite of the purge which is performed after the regeneration of said catalyst, and produce an explosion in the reduction zone 26, this explosion can not propagate through reactor 29 which here is completely separate from the reduction zone. Similarly, if necessary, it is easy to cut off the heating either of the reduction zone or of the sulfurization zone, while this operation is impossible in the process of FIG. 1 and very difficult in the case of FIG. 2, where said two zones are placed at the top of the first reactor. It may even be considered, at this stage, to provide for a cooling of the reduction zones 23, 25 and 26 by passing through line 5 a cold fluid instead of a hot fluid.

Similarly, if, by accident, undesirable impurities appear in pure hydrogen (said impurities being liable to produce parasitic reactions, particularly hydrocracking), the means for controlling the temperatures of the different zones, as precedingly described, make it possible to maintain the control of the unit.

(In the present specification, the term "substantially pure hydrogen" is used. It must be observed in relation therewith that methane is not considered as an undesirable impurity when present up to an amount equal, by volume, to that of hydrogen, which means that it is here possible to make use of a "substantially pure hydrogen" stream containing up to 50% by volume of methane. Similarly, "substantially pure hydrogen" may be used which contains, in addition to methane, various hydrocarbons such as ethane, propane, etc..., provided that the total content of said hydrocarbons, in proportion to the gas mixture, is not in excess of preferably 2 or 3% by volume or, at the very most, 4 or even 10% by volume).

It follows that the operating conditions of the whole unit are considerably safer than according to the prior art processes. These security conditions are the more increased as, in the diagram of FIG. 3 according to the invention, there is provided a zone of calm (that of lift 19) between two zones which may become exothermic, these two zones being vessel 15 were takes place the hydrogenation and the reaction zone (reactor 29). In the prior art, no zone of calm did exist between the reduction zone and the reaction zone (zones 20 and 22 of FIG. 1 or zones 20 and 29 of FIG. 2).

In zones 17, 19, 20, 27 and 28 of FIG. 3, the catalyst becomes quiet by sulfur of the sulfur compound introduced through line 24; as a matter of fact, it is always to be feared that the catalyst, after its outgoing from the regeneration zone 10, up to its introduction in reactor 29, continues to produce, in the various lines or ducts of the apparatus, parasitic hydrocracking reactions, so that it should be necessary, between the regeneration zone and the reactor, to use only pure or substantially pure hydrogen streams and not streams of recycle hydrogen containing various traces of hydrocarbons of any kind, in ducts 14, 18 and optionally 24, if hydrogen is used to carry the sulfur compound (this is of course also valid for the processes of the prior art); now, sulfur reduces this tendency to hydrocracking, so that if, unhappily, a parasitic hydrocracking begins to occur in zones upstream lift 19, said parasitic reaction is not liable to propagate through lift 19, as it should have been the case in the prior art where the reduction and sulfurization zone are close to each other or even, sometimes form a single zone.

The system of the invention, according to FIG. 3, further provides, as compared to the prior art, for the omission of various ducts and regulation systems for performing the reduction and the sulfurization: in the process of the prior art, as shown in FIGS. 1 and 2, the reduction required an additional hydrogen stream (duct 21 on FIGS. 1 and 2); said stream no longer exists in the process of the invention.

According to the process of the invention, as shown in FIG. 3, various temperature, flow and pressure regulations have been deleted.

In the system of FIG. 3, according to the invention, the volume of the zones or enclosures comprised between regeneration zone 10 and reactor 29 is clearly smaller than in the processes of the prior art, as described with reference to FIGS. 1 and 2 (particularly by reducing the size of zone 20 of FIG. 3 as compared to the two zones 20 of FIG. 1 and 2). Moreover, the reduction is conducted in fact in the storage-reduction zone 15 and does not require an additional storage in an independent reduction zone. It follows than the total amount of catalyst used in the whole apparatus is reduced as compared to that of the prior art. It has been calculated, for example, that a benzene production unit requiring 40 metric tons of catalyst when proceeding according to the system of FIGS. 1 and 2, requires only 39.5 metric tons of catalyst while proceeding in accordance with FIG. 3: the catalyst price for the benzene producing reaction being about 50 US dollars per kilogram, a saving of about 25,000 US dollars, per unit built according to the process of FIG. 3, is obtained.

FIG. 3 shows an arrangement in which the regeneration zone 10 and the reduction zone 26 are placed aside the reactor, thus requiring a lifting device to raise up the regenerated and reduced catalyst above the first reaction zone.

Figure 4:
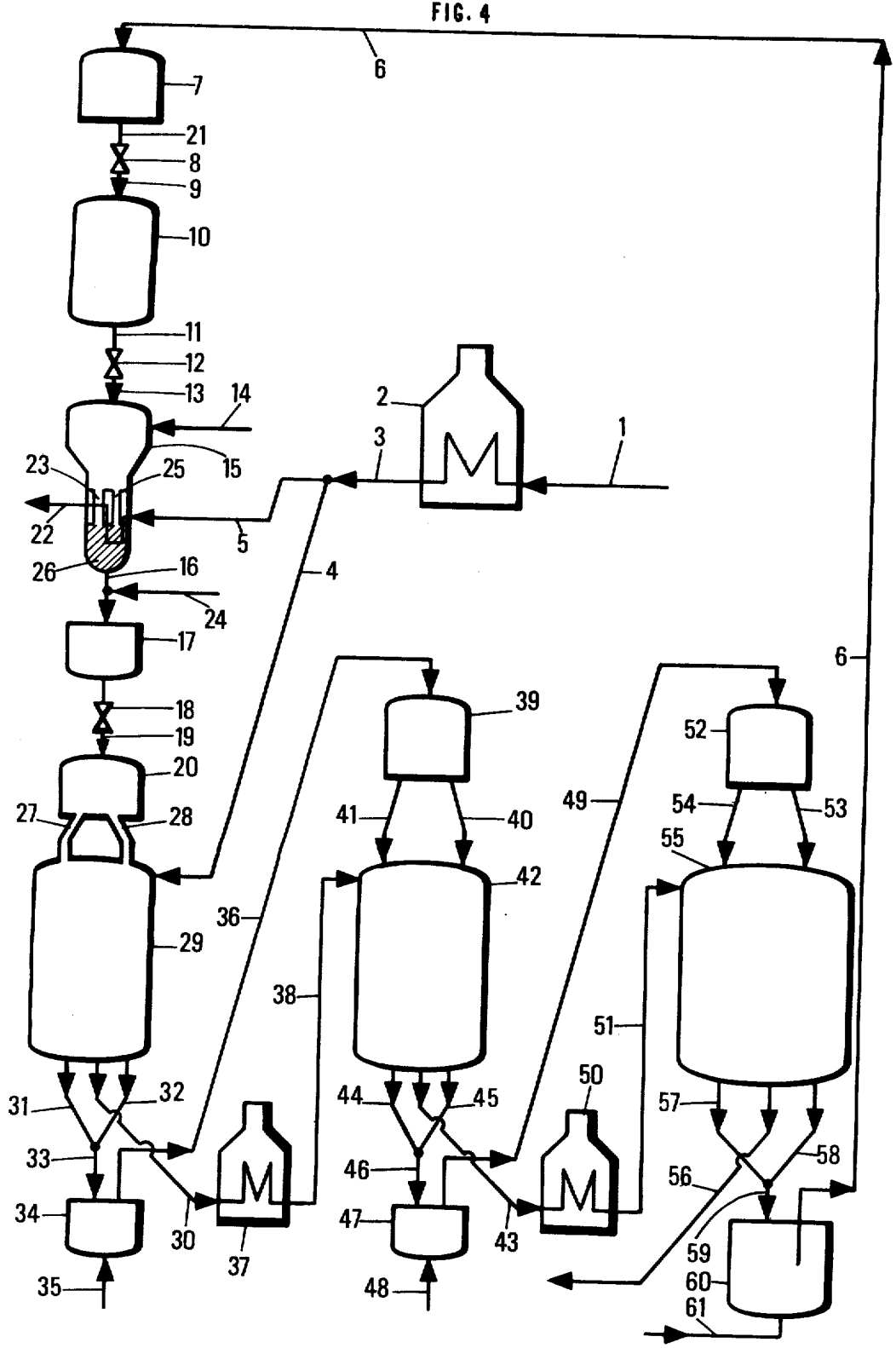
FIGS. 4,5,6, 7 and 8 show various alternative embodiments to that shown in FIG. 3.

It has been observed, particularly when the reactors are of moderate size, or even when they are of big size, that it may be advantageous, in some cases, to perform the invention with a different arrangement, as illustrated by FIG. 4, wherein the regeneration zone is located above the reduction zone and the sulfurization zone, both reduction and sulfurization zones being themselves located above the reaction zone wherein is introduced the regenerated, reduced and then sulfurized catalyst. This system makes it possible to omit the lift and, consequently, to reduce to a larger extent the total amount of catalyst used in the unit, to obtain a larger flexibility in the catalyst circulation from the regeneration zone up to the catalyst inlet of the first reactor.

FIG. 4 illustrates this other arrangement of the process of the invention.

According to this FIG. 4, three reactors are used; the charge is introduced through oven 2 and lines 3 and 4 into the first reactor 29. The effluent from the first reactor is withdrawn through line 30 and fed, through furnace 37 and line 38, to the second reactor 42. The effluent from the second reactor is withdrawn through line 43 and fed, through oven 50 and line 51, to the third reactor 55. The effluent from the third reactor is withdrawn through line 56. Fresh catalyst, at the starting of the unit, is introduced into the first reactor 29 through a line, not shown in the figure, or, together with regenerated catalyst, through a plurality of lines such as 27 and 28. The catalyst progresses through reactor 29 as a moving bed.

The catalyst is withdrawn from reactor 29 through a plurality of lines such as 31 and 32 and through line 33 leading to the lift pot 34. This withdrawal is conducted continuously (a valve system being not necessary), the regulation of the flow rate of the catalyst is achieved through a suitable conventional adjustment, by pure hydrogen or hydrogen for the unit injected at the level of apparatus 34, through a line, not shown on the Figure.

Sufficient gas from the unit is fed to prevent the carrying away of a portion of the reaction effluent with the catalyst particles. The catalyst is then conveyed from the lift pot 34 to the second reactor 42 by any known lifting device, called herein "lift". The lift fluid is advantageously recycle hydrogen and/or hydrogen produced in the unit, introduced through line 35.

The catalyst, thus conveyed through ift 36, reaches the vessel 39, wherefrom, through a plurality of lines such as 40 and 41, it reaches the second reactor 42 (The vessel 39 and lines 40 and 41 may optionally be integral with reactor 42 i.e. arranged inside reactor 42).

The catalyst passes through reactor 42 as a moving bed, is withdrawn continuously from said reactor as in the case of the first reactor 29, through a plurality of lines such as 44 and 45 and reaches the lift pot 47 through line 46.

Through lift 49, fed for example with recycle hydrogen, through line 48, the catalyst reaches vessel 52, wherefrom, through a plurality of lines such as 53 and 54, it reaches the third moving bed reactor 55. The catalyst is withdrawn continuously from the third reactor 55, as in the case of the first or second reactors 29 and 42, through a plurality of lines 57 and 58; this used catalyst reaches the lift pot 60 through line 59. The used catalyst is then fed to an "accumalator-decanter" 7 through lift 6 fed, for example, with recycle hydrogen introduced through line 61 in the lift pot 60. The used catalyst reaches, through a valve system 8 and lines 21 and 9, the regeneration zone 10. Once the catalyst has been regenerated and purged for removing molecular oxygen (the various feed lines required for the regeneration and the purging being conventional have not been shown in the drawings), this regenerated catalyst is periodically or continuously conveyed, through lines 11 and 13 and optionally the valve system 12, to the upper portion of an enclosure 15, wherein is introduced substantially pure hydrogen through line 14. The catalyst progresses through conventional means, such for example as ducts 23 and 25, towards the lower portion or zone 26 of enclosure 15; in said zone 26 and in lines 23, 25, the regenerated catalyst is reduced by means of substantially pure hydrogen, introduced through line 14. This reduction is performed at the desired temperature, for example 500° C., zone 26 being heated by any convenient means, for example by indirect contact with a portion of the charge, through the intermediary of lines 5 and 22.

The regenerated and reduced catalyst is withdrawn from enclosure 15 (located above the first reactor 29) through line 16 and an optional valve, not shown on the figure, and flows down into a first enclosure or receiver 17 located above the first reactor 29.

The sulfurization reaction (conducted in the operating conditions mentioned in relation with FIG. 3) may be initiated in said enclosure 17, the sulfurized compound, optionally carried by an hydrogen stream, being introduced through line 24. Then the catalyst continues to flow down, through line 18 and optionally valve 19, into a second enclosure or accumulating vessel 20, the catalyst flowing then continuously, as a moving bed, from the outlet of zone 20 to the first reactor 29, through a plurality of ducts or "legs" such as 27 and 28; the catalyst flows as a moving bed from zone 15 to reactor 29 (the optional valves placed on the catalyst path, are not accordingly necessary). The continuous progression of the catalyst is necessary to ensure a good regulation of the reduction and sulfurization temperatures and for avoiding to subject the catalyst to too abrupt temperature changes.

The hydrogen excess of the reduction zone may be removed through a discharge line, not shown on the figure.

The sulfurization, which is conducted after reduction of the regenerated catalyst, is thus performed in the device of FIG. 4, partly in zone 17 and partly in line 18, optionally also partly in vessel 20 and in legs 27 and 28.

Figure 5:
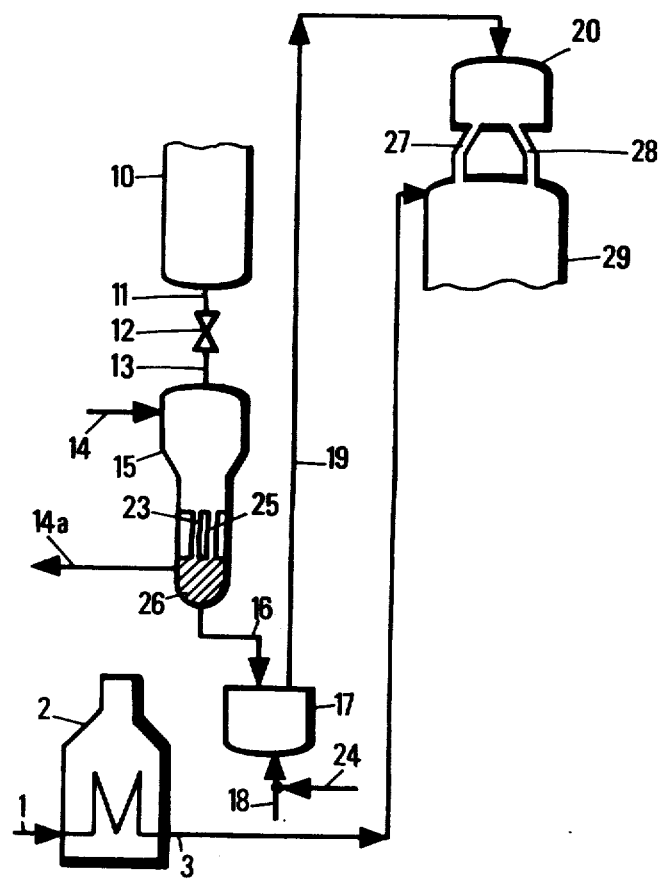

Another possible arrangement for carrying out the invention illustrated by FIG. 5.

Here the process is characterized by a very low temperature of the hydrogen treatment: As a matter of fact, it has been discovered that it was particularly advantageous to conduct the reduction of the regenerated catalyst at a temperature lower than 450° C., preferably from 380° to 445° C. It is even possible to proceed at a much lower temperature, for example preferably from 150° to 290°]C. This is not properly a true reduction reaction since the temperature is not sufficiently high; it is rather a partial reduction or more exactly a treatment of the catalyst with hydrogen at moderate temperature whereby an incomplete but sufficient reduction is achieved to obtain a good activity of the catalyst. It has been observed that the hydrogen treatment of the regenerated catalyst, conducted in that manner, was as efficient for certain catalysts, as far as their life time and stability are concerned, as the reduction of these catalysts at a temperature equal to or higher than 480° C. This hydrogen treatment according to the invention, at a temperature lower than 450° C., thus appears efficient mainly for a few more sophisticated new catalysts used in the recent years either for the reforming reactions or for the reactions of producing aromatic hydrocarbons and particularly of producing highly pure benzene (so-called "Aromizing" reactions). The catalyst is generally subjected to this hydrogen treatment during a more or less long period required for example for its passing, as fixed or moving bed, but preferably as moving bed, through zone 15. When the treatment with hydrogen is performed between 380° and 445° C., the sulfurization is preferably conducted at a temperature lower than the hydrotreatment temperature, more particularly at a temperature lower, by about 50° C., than the hydrotreatment temperature, said sulfurization temperature being advantageously from 260° to 390° C. and, more particularly, from 280° to 380° C. When the hydrogen treatment is performed between 150° and 290° C., the sulfurization temperature will be advantageously from 200° to 390° C.

The specific catalysts suitable for this hydrogen treatment at a temperature lower than 450° C. are the catalysts containing an alumina carrier and critical contents of various adequate metal elements (metals or metal compounds). The specific catalysts for the reforming reactions are those containing, by weight with respect to the alumina carrier:

(a) 0.2 to 0.4% of a first metal selected from platinum, iridium, ruthenium and rhodium.

(b) 0.02 to 0.07% of a second metal, different from the first metal and selected from iridium and rhodium.

(c) 0.25 to 0.55% of at least one third metal selected from copper, silver, gold, titanium, niobium, indium, thallium, manganese, germanium, tin, lead and rhenium.

(d) 0.1 to 10% of halogen, for example chlorine or fluorine.

Specific catalysts for the aromizing reactions (reactions for producing aromatic hydrocarbons) are those which contain, by weight with respect to the alumina carrier:

(a) 0.45 to 0.65% of a first metal selected from platinum, iridium and rhodium.

(b) 0.03 to 0.05% of a second metal, different from the first one, and selected from iridium, rhodium, ruthenium, palladium and osmium, or 0.05 to 0.15% of rhenium.

(c) 0.02 to 0.045% of a metal selected from copper, gold, silver or 0.1 to 0.2% of manganese or 0.2 to 0.3% of a metal selected from titanium, niobium, thallium, cadmium and indium.

(d) 0.1 to 10% of a halogen, for example chlorine or fluorine and optionally an additional fourth metal element, i.e.:

(e) 0.1 to 0.4% and preferably 0.2 to 0.3% of cobalt.

The performance of the process with hydrogen treatment of the regenerated catalyst, at a temperature lower than 450° C., is achieved with the arrangement of FIG. 3, to which a few minor changes have been brought, the main of which appear on FIG. 5: on said FIG. 5, lines 5 and 22 of FIG. 3 have been omitted since it is no longer necessary to make use of an external heat supply in order to obtain the desired temperature in zone 26 for the hydrogen treatment according to FIGS. 3 and 5. The hydrogen excess, after said hydrogen treatment, may be withdrawn from the bottom of zone 26, through a discharge line 14-a on FIG. 5. It is also possible to omit lines 23 and 25 of FIG. 5.

When operating according to FIG. 5, it becomes particularly easy to proceed to the sulfurization at a temperature between 260° and 390° C. or between 200° and 390° C. When the hydrogen treatment temperature is from 380° to 445° C. it suffices, for example, to lower by at least 50° C., the temperature which was accordingly about 380°-445° C. in the upstream zone 26, to not heat for example the lift pot 17 or to make use of a convenient heat-insulation (or absence of heat-insulation) of said lift pot 17 and/or of line 16 and lift 19 and/or legs 27 and 28. It is also possible to regulate the sulfurization temperature by acting not only on the thermal losses of the lift pot, or of the lift itself, or of the legs 27 and 28, but also by acting completely or partly on the temperature of the hydrogen introduced, through line 18, as carrying gas, into lift 19. When the hydrotreatment temperature is from 150° to 290° C., these temperatures are either maintained up to the level of lines 27 and 28 or, for example, the temperature of the sulfurization zone is increased by heating the hydrogen introduced through line 18.

One advantage of proceeding according to FIG. 5, particularly with a hydrotreatment of the regenerated catalyst lower than 450° C. is that, if, by accident, traces of oxygen are still present in the regenerated catalyst, in spite of the purge following the regeneration itself, this could produce, for example, as a result of an accident, an explosion in zone 26; but, on the one hand, this explosion becomes less probable since said zone is not at a high temperature and, on the other hand, even if such an explosion occurred, it could not propagate up to reactor 29, since the latter is now too far from the reduction zone 26. Similarly, when necessary, it is very easy to control the temperature either in the hydrotreatment zone or in the sulfurization zone, said control being more difficult to perform according to the prior art (FIGS. 1 and 2) where the reduction zones are located at the top, or close to the top, of the reactor, wherefrom it is apparent that the operating conditions of the unit are considerably safer.

The arrangements of FIGS. 1 and 2 do not permit to proceed according to the invention, i.e. to perform the hydrotreatment of the regenerated catalyst at a temperature lower than 450° C.

As a matter of fact, it has been made apparent, in FIG. 1, that there is no means to lower below 480° C. either the reduction temperature or the sulfurization temperature. The arrangement of FIG. 2 could nearly make it possible but, in FIG. 2, the heat control of zone 20, through diversion 5, whose temperature is higher than 450° C., would be difficult. Even, by not heating zone 20 and by conveniently heat-insulating lift 19, the heat losses are such that the catalyst flowing out at a maximum temperature of 500° C. from the regeneration zone 10 would be at a maximum temperature of 360°-370° C. when reaching zone 20, and accordingly, it would be necessary to heat the reduction zone 20 by use of an expensive external heat supply. On the contrary, according to the scheme of FIG. 5, where the catalyst flows out from the regeneration zone at a maximum temperature of 500° C., the heat loss through lines 11 and 13 and valve 12 is such that zone 15 is just at the desired temperature, lower than 450° C. This results, as compared to the system of FIG. 3, in a substantial energy saving, by omitting the diversion of the charge, through line 5 of FIG. 3.

The process of FIG. 5 further provides for the new following advantage:

Up to now, it was necessary to avoid using hydrogen from the unit in lift 19 through which the catalyst is raised from zones 17 to zones 20 of the three FIGS. 1, 2 and 3. As a matter of fact, the catalyst always tends, when using hydrogen from the unit, to catalyze parasitic reactions of hydrocracking of the hydrocarbon traces which may be contained in the hydrogen from the unit; this parasitic hydrocracking is also possible in the case of FIG. 3 where a sulfur compound is injected at the inlet of the lift, through line 24, precisely in order to reduce, by sulfurization, the activity of the active elements of the catalyst. Now, in the process of FIG. 5, the zone of reduced activity of the lift, instead of being located between two very hot zones (which, in FIG. 3, were, on the one hand, the reactor, downstream and, on the other hand, the hot reduction zone 26, upstream), is now placed between a zone 26, relatively cold, in the case of FIG. 5, and the hot reactor 29. This, in addition to the fact that, in lift 19, the sulfurization is performed at a temperature lower than 390° C., results in that, the process of the invention, the zone where a hydrocracking parasitic reaction could occur is at a temperature insufficient for the occurrence of such a kind of reaction. It results that, although it is not recommended to proceed by this way in a permanent manner, it is possible to inject into line 18, of FIG. 5, instead of pure hydrogen, hydrogen from the unit, this being excluded in the prior art and even when proceeding according to FIG. 3. Similarly, when the hydrotreatment temperature is sufficiently low (150°-290° C.), it is possible to make use of the hydrogen from the unit in line 14 and zone 15 of FIG. 5. This use of hydrogen from the unit, in line 18 and optionally in line 24, as carrying gas for the sulfur compound, and, optionally in line 14, is much appreciated, particularly in case of pure hydrogen shortage, for any reason. It is then unnecessary to stop the unit and it suffices to make use temporarily of the hydrogen from the unit, in contrast with the prior art techniques which require, in case of pure hydrogen shortage, to stop all the units on run.

FIG. 5 shows an arrangement wherein the regeneration zone 10 and the hydrotreatment zone 26 of the regenerated catalyst are placed aside the reactors, thus requiring a lifting device (lift 19) to raise the regenerated and hydrotreated catalyst above the first reaction zone 29.

Figure 6:
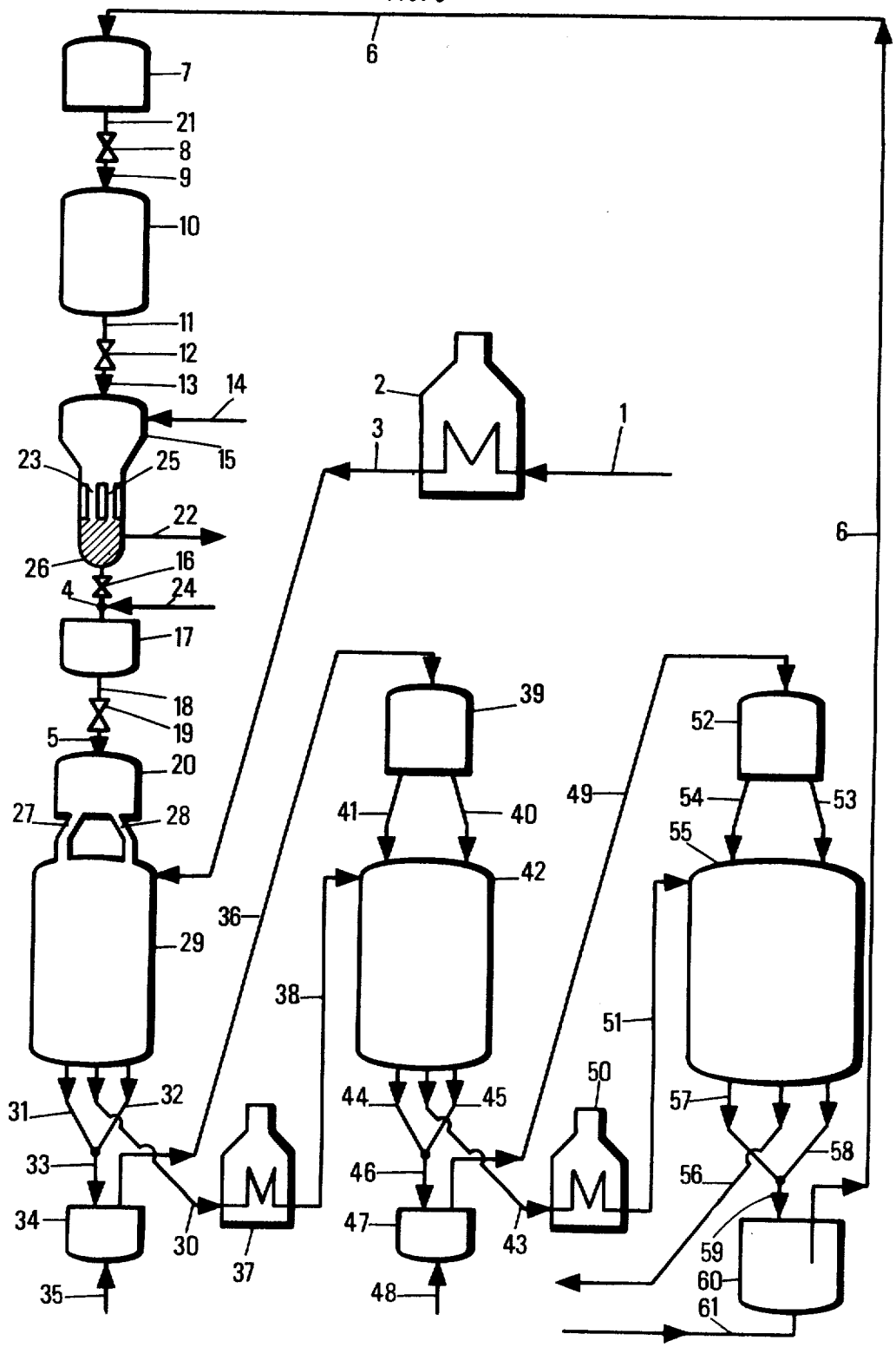

Now, it has been observed, particularly when the reactors are of middle size, or even of large size, that it may be advantageous, in some cases, to perform the invention with a different arrangement, explained on FIG. 6, wherein the regeneration zone is placed above the hydrotreatment zone and the sulfurization zone, both hydrotreatment and sulfurization zones being themselves above the reaction zone wherein is introduced the catalyst, after regeneration, hydrotreatment and sulfurization thereof. By this system, it is possible to omit the lift and, consequently, to reduce the total amount of catalyst used in the unit, while proceeding with more flexibility in the circulation of the catalyst from the regeneration zone to the catalyst inlet into the first reactor.

In the case of FIG. 6, three reactors are used.

The charge is introduced, through line 1, furnace 2 and line 3, into the first reactor 29. The effluent from the first reactor is withdrawn through line 30 and conveyed, through furnace 37 and line 38, to the second reactor 42. The effluent from the second reactor is withdrawn through line 43 and fed, through furnace 50 and line 51, to the third reactor 55. The effluent from the third reactor is withdrawn through line 56. Fresh catalyst, at the starting of the unit, is introduced into the first reactor 29 through a line, not shown in the figure, or, together with the regenerated catalyst, through a plurality of lines such as 27 and 28. The catalyst progresses through reactor 29 as a moving bed.

The catalyst is withdrawn from reactor 29 through a plurality of lines such as 31 and 32 and through line 33, leading to the lift pot 34. The withdrawal is continuous (a valve system being not necessary), the catalyst flow rate regulation being achieved by a convenient conventional adjustment of the hydrogen feed, either pure or from the unit, injected at the level of apparatus 34 through a line, not shown on the figure.

A sufficient portion of the unit output is used for preventing the carrying away of a portion of the reaction effluent with the catalyst particles. The catalyst is then driven continuously from the lift pot 34 towards the second reactor 42, by any known lifting device, referred to herein as "lift". The fluid of the lift is advantageously recycle hydrogen or hydrogen produced by the unit, introduced through line 35. The catalyst, thus driven through lift 36, reaches the vessel 39, wherefrom, through several lines such as 40 and 41, it reaches the second reactor 42 (vessel 39 and lines 40 and 41 may optionally be integral with reactor 42, i.e. arranged inside the reactor itself).

The catalyst passes through reactor 42 as a moving bed, is continuously withdrawn from this reactor, as in the case of the first reactor 29, through several lines such as 44 and 45, and reaches the lift pot 47 through line 46. Through lift 49, fed for example with recycle hydrogen, through line 48, the catalyst reaches the vessel 52, wherefrom, through a plurality of lines such as 53 and 54, it reaches the third moving bed reactor 55. The catalyst is continuously withdrawn from the third reactor 55, similarly as from the first and second reactors 29 and 42, through a plurality of lines 57 and 58; this used catalyst reaches the lift pot 60 through line 59. The used catalyst is then fed to an "accumulator-decanter" vessel 7, through lift 6, fed for example with recycle hydrogen introduced through line 61 into the lift pot 60. The used catalyst reaches, through the valve system 8 and lines 21 and 9, the regeneration zone 10. Once the regeneration performed and the regenerated catalyst purged for removing molecular hydrogen therefrom (the various feed lines required for regeneration and purge, since conventional, have not been shown), this regenerated catalyst is fed, through lines 11 and 13 and the valve system 12, to the upper part of an enclosure 15, wherein hydrogen is introduced through line 14. The catalyst is conveyed, through conventional means, such for example, as the optional lines 23 and 25, towards the lower portion or zone 26 of enclosure 15; in said zone 26 the regenerated catalyst is hydrotreated, by means of hydrogen introduced through line 14, in fixed or moving bed. This reduction is conducted at the desired temperature, in the present case lower than 450° C., as explained in relation with FIG. 5.

The regenerated catalyst is treated with hydrogen and withdrawn from encllosure 15 (located above the first reactor 29) through line 4 and optional valve 16 and continuously flows down into receiver 17 located above the first reactor 29. The sulfurization reaction may be started in said enclosure 17, the sulfurized compound, optionally carried by a hydrogen stream, being introduced through line 24. The catalyst then continues to flow down through lines 18 and 5 and, optionally, through valve 19, into accumulator vessel 20. The catalyst then continuously flows down, as a moving bed, from zone 20 to the first reactor 29, through a plurality of lines or "legs" such as 27 and 28. The catalyst flows as a moving bed from the outlet of zone 15, to reactor 29 (the optional valves being open or omitted), so as to ensure a good regulation of the hydrotreatment and sulfurization temperatures and to avoid that the catalyst be subjected to abrupt temperature variations.

The hydrogen excess during the hydrotreatment may be removed through discharge line 22.

The sulfurization, which is performed after the hydrotreatment of the regenerated catalyst, is thus achieved, according to the device of FIG. 6, partly in zone 17 and partly in lines 18 and 5, optionally also partly in vessel 20 and legs 27 and 28.

FIGS. 5 and 6 illustrate the process characterized in that the regenerated catalyst is subjected, before being reintroduced into the reactors, to a treatment with hydrogen at a temperature lower than 450° C.

The hydrogen treatment being conducted at a temperature lower than that used in the process of the invention corresponding to FIGS. 3 and 4, it follows that, in case of shortage of pure or purified hydrogen, it is possible to provisionally make use of hydrogen from the unit, on the one hand, for this hydrotreatment and, on the other hand, in the case of FIG. 5, for raising up the regenerated catalyst to the first reactor, through a lift whose motive fluid is hydrogen, without liability of parasitic hydrocracking reactions which would produce explosions in the apparatus.

It has now been observed (provided that the treatment with hydrogen is conducted at a temperature from 320° to 370° C., preferably at about 350° C., and the sulfurization at a temperature lower by 70 to 130° C. than the hydrotreatment temperature, this temperature being from 200 to 280° C., preferably from 220° to 280° C. and, more preferably, close to about 250° C.), that it is possible to make use of the hydrogen produced in the unit for the hydrotreatment and as carrying gas when a lift is used in the apparatus (to drive the catalyst treated with hydrogen to the top of the reactor), over the whole running time of the unit, provided that the hydrogen from the unit be subjected to a relatively simple purification step comprising, for example, washing the hydrogen from the unit in a plate column, by means of a liquid effluent of the reformate. The so-purified hydrogen from the unit will be called "purified unit hydrogen" in the following specification. As a result of the relatively low temperature of the treatment with hydrogen and of the sulfurization reaction, this hydrogen, issued from the unit and purified in a simple manner and to a small extent, in spite of the impurities still contained therein after this simple purification, will not produce parasitic explosions due to hydrocracking secondary reactions of the hydrocarbons contained therein; as a matter of fact, these secondary reactions cannot occur at the relatively low temperatures used for the hydrogen treatment and for the sulfurization. In the processes according to FIGS. 1 to 4, where the hydrogen treatment and the sulfurization of the catalyst are performed at relatively high temperatures, generally close to those used in the reactors themselves, it was necessary to use either pure hydrogen or, optionally, recycle hydrogen or hydrogen from the unit preliminarily subjected to a severe purification by expensive physico-chemical methods such as the passage of hydrogen over molecular sieves or purifications through cryogenic methods. In the cases of FIGS. 5 and 6, recycle hydrogen or hydrogen from the unit could be used provisionally.

In the present process, illustrated below by FIGS. 7 and 8, there can be used hydrogen from the unit, purified in the above-mentioned manner. As also explained above, this purified hydrogen may contain up to 10% by volume, preferably 4%, of various light hydrocarbons such as ethane and propane. It is to be observed, as already mentioned, that methane is not considered as an impurity up to an amount by volume equal to that of hydrogen, which would mean that, in this limit case, the hydrogen stream could contain 50% of methane by volume.

Figure 7:
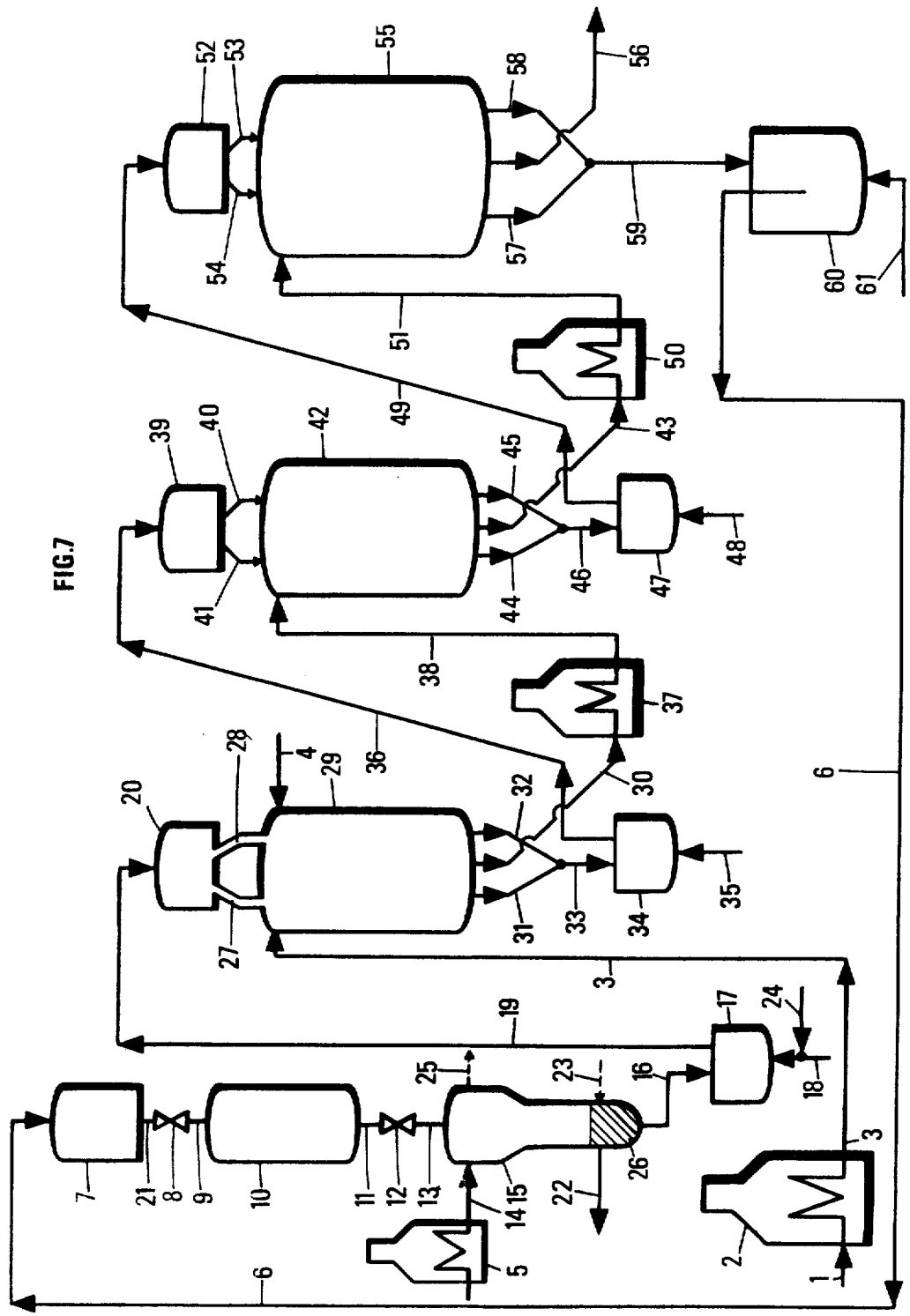
Figure 8:
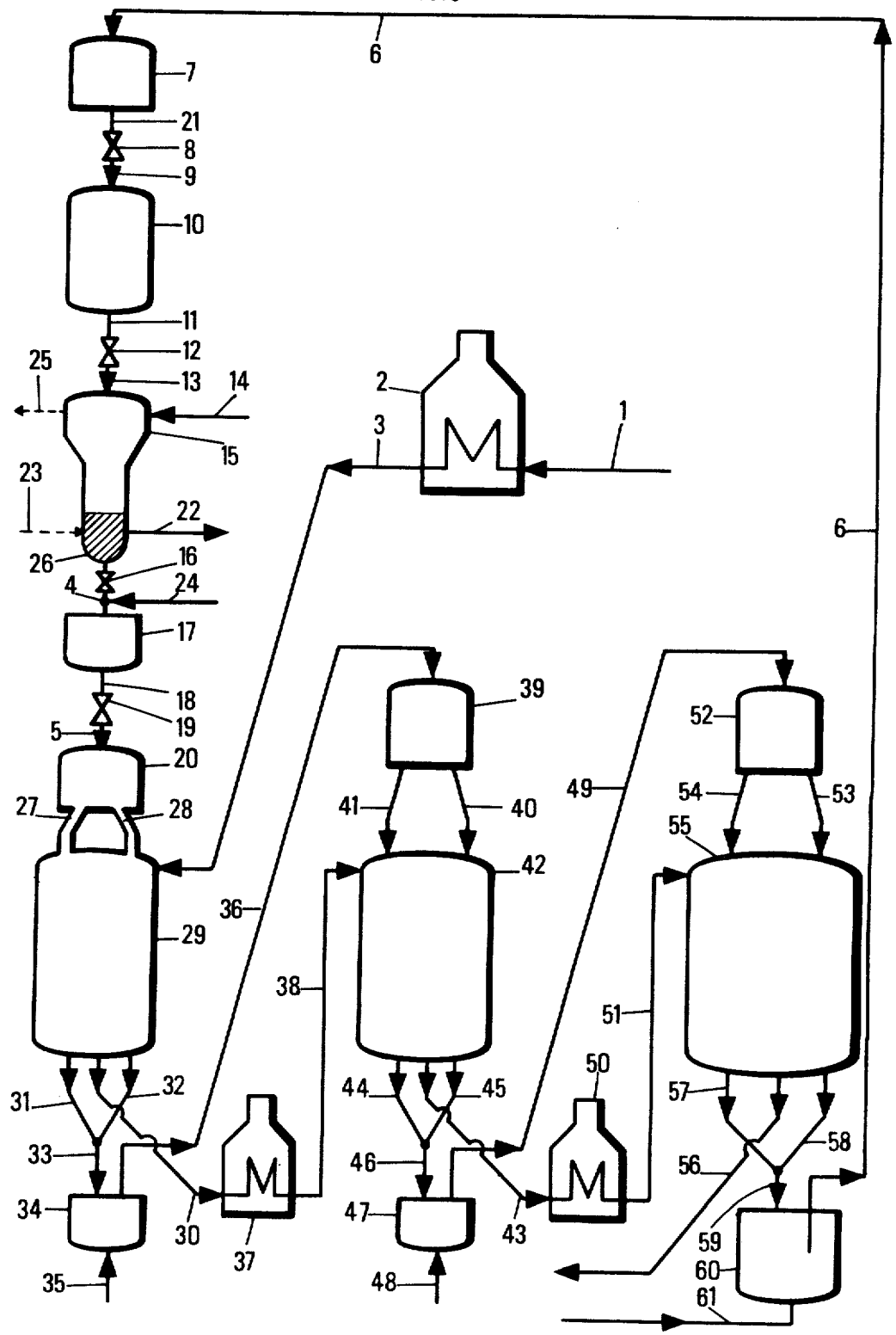

The hydrogen from the unit may thus be used as such, in the arrangements of FIGS. 7 and 8 which illustrate this improvement, not only provisionally when other hydrogen sources are exhausted (as explained in relation with FIG. 5) but also, after a simple purification, as hydrogen source over the whole running period of the reforming reaction or aromatic hydrocarbon production, for the hydrotreatment of the regenerated catalyst and, when the regeneration zone is close to the first reactor, as motive fluid for the lift used for raising the regenerated and hydrotreated catalyst above the first reactor.

In the cases corresponding to the two FIGS. 7 and 8, three reactors are used. In both cases, the charge is introduced through line 1, furnace 2 and line 3, into the first reactor 29. The effluent from the first reactor is withdrawn through line 30 and fed, through furnace 37 and line 38, to the second reactor 42. The effluent from the second reactor is withdrawn through line 43 and fed, through furnace 50 and line 51, to the third reactor 55. The effluent from the third reactor is withdrawn through line 56. Fresh catalyst, at the starting of the unit, is introduced through a line, not shown on FIG. 8, and corresponding, for example, to line 4 of FIG. 7. The catalyst issued, in the cases of the two FIGS. 7 and 8, from the regeneration zone 10, is fed to the first reactor 29 through lines 27 and 28, wherethrough it progresses as a moving bed. The catalyst is withdrawn from reactor 29 through a plurality of lines such as 31 and 32 and through line 33, leading to the lift pot 34. This withdrawal is performed continuously (a valve system being not required), the regulation of the catalyst flow rate being achieved through a convenient conventional regulation of hydrogen feed (pure hydrogen or hydrogen from the unit) injected through a line, not shown in FIGS. 7 and 8, at the level of zone 34.

A sufficient amount of gas from the unit is used to prevent the carrying away of a portion of the reaction effluent with the catalyst particles. The catalyst is then driven from the lift pot 34 to the second reactor 42 by any known lifting device, which will be referred to as "lift". The lift fluid is advantageously recycle hydrogen or hydrogen produced by the unit, introduced through line 35. The catalyst thus driven into lift 36, reaches vessel 39, wherefrom, through a plurality of lines such as 40 and 41, it reaches the second reactor 42. (Vessel 39 and lines 40 and 41 may optionally be integral with reactor 42 i.e. arranged inside the reactor itself).

The catalyst passes through reactor 42 as a moving bed, is withdrawn from this reactor continuously, as in the case of the first reactor 29, through a plurality of lines such as 44 and 45, and reaches the lift pot 47 through line 46.

Through lift 49, fed for example with recycle hydrogen from line 48, the catalyst reaches vessel 52, wherefrom, through a plurality of lines such as 53 and 54, it reaches the third moving bed reactor 55. The catalyst is continuously withdrawn from the third reactor 55, similarly as from the first and second reactors 29 and 42, through a plurality of lines 57 and 58; the used catalyst reaches the lift pot 60 through line 59. This used catalyst is then fed to an "accumulator-decanter" vessel 7 through lift 6, fed for example with recycle hydrogen introduced through line 61 into the lift pot 60. The used catalyst reaches, through a valve system 8 and lines 21 and 9, the regeneration zone 10. After the regeneration and purge of the catalyst have been performed in zone 10, the catalyst reaches, through lines 11 and 13 and the valve system 12, the upper portion of an enclosure 15 wherein is introduced the purified unit hydrogen, through line 14. The catalyst is conveyed as a moving bed to the lower portion, or zone 26, of enclosure 15; in said zone 26 the regenerated catalyst is treated with hydrogen introduced through line 14. The catalyst progresses through 26 as a moving bed.

In FIG. 7, the regenerated and hydrotreated catalyst is continuously withdrawn from enclosure 15 through line 16 and reaches the lift pot 17, wherefrom it is continuously driven by the purified unit hydrogen, introduced through line 18, into lift 19, towards a receiver vessel 20, located, on FIG. 7, above the first reactor 29. In this receiver vessel 20, the catalyst then flows continuously as a moving bed, through a plurality of lines or "legs" such as 27 and 28 towards the first reactor 29. The sulfurization which is performed after the hydrotreatment of the regenerated catalyst is conducted partly in the lift pot 17 and partly in lift 19, optionally also partly in the vessel 20 and legs 27 and 28. The sulfur compound, and optionally hydrogen (preferably purified unit hydrogen) which is used as carrying gas for the sulfur compound, is introduced in the lift pot 17 through line 24.

The progress of the catalyst through zones 15, 17 and 20, through lift 19 and through transfer lines for this catalyst, is performed continuously so as to ensure a good regulation of the hydrotreatment and sulfurization temperatures and to avoid subjecting the catalyst to abrupt temperature variations.

The hydrogen excess during the hydrogen treatment may be removed through discharge line 22.

In the case of FIG. 8, the regenerated and hydrotreated catalyst is continuously withdrawn from enclosure 15 (located above the first reactor 29) through line 4 and an optional valve 16 and flows down continuously into the receiver vessel 17, located above the first reactor 29. The sulfurization reaction may be started in said enclosure 17, the sulfur compound, optionally carried by a hydrogen stream (purified unit hydrogen), being introduced through line 24. Then the catalyst still flows down continuously through lines 18 and 5, and optionally valve 19, into accumulator vessel 20. Then the catalyst continuously flows, as a moving bed, from zone 20 to the first reactor 29, through a plurality of lines or "legs" such as 27 and 28. The catalyst flows as a moving bed, from zone 15 to reactor 29 (the optional valves being open or omitted), to ensure a good hydrotreatment and sulfurization temperature regulation and subject the catalyst to progressive and not abrupt temperature changes.

The hydrogen excess during the hydrotreatment may be removed through discharge line 22.

In the case of FIG. 8, the sulfurization, which is performed after the hydrotreatment of the regenerated catalyst, is conducted partly in zone 17 and partly in lines 18 and 5, optionally also partly in vessel 20 and legs 27 and 28.

In both arrangements of FIGS. 7 and 8, the purified unit hydrogen, introduced through the two lines 14 of these figures, may be heated either by means of at least a portion of the charge or of the reaction effluent or in a separate furnace. (On FIG. 7, is shown a furnace 5, provided for heating the hydrogen introduced through line 14).

In both FIGS. 7 and 8, the purified unit, hydrogen is fed to zone 15, through line 14, located at the upper portion of zone 15, the hydrogen excess being withdrawn through discharge line 22, located at the lower portion of zone 15. It has been observed that it may be advantageous (lines 14 and 22 being then omitted) to introduce the purified unit hydrogen through a line 23, at the lower portion of zone 15, the hydrogen excess being withdrawn through the discharge line 25, at the upper portion of enclosure 15. This procedure with a hydrogen stream flowing counter-currently with respect to the catalyst to be treated, provides on the one hand for a better contact between hydrogen and the catalyst particles (particularly in portion 26 of zone 15 which is narrower than the upper portion of enclosure 15) and, on the other hand, for a reduced hydrogen consumption than in the case of a co-current operation.

The counter-current system further provides, by regulation of the hydrogen flow rate, for an easier regulation of the catalyst flow inside zone 15.

It must be observed that the used catalyst withdrawn, through line 59 of FIGS. 7 and 8, from the last reactor 55, contains hydrocarbon traces and sulfur or sulfur compounds traces; these various traces are undesirable in the regeneration zone 10 (the presence of hydrocarbons increases the combustion rate and sulfur poisons the catalyst). It has been found that it was advantageous to clean the used catalyst, stored in zone 7, by scavenging for with at least a portion of the hydrogen flow from line 14 (purified unit hydrogen). This scavenging may be achieved before the passage of the catalyst from zone 7 to zone 10 or during the transfer of the catalyst from zone 7 to zone 10.

In FIGS. 3 to 8, according to the invention, the regenerated catalyst may be subjected to the reduction or the hydrotreatment in zones 15 of these figures, either as fixed bed or as moving bed. Preferably zones 15 are of the moving bed type for ensuring a better continuity of the catalyst flow. In this case, for sake of clarity, these figures do not show the accessorily required valves or vessels used for example in the case where the regeneration is conducted in fixed bed, for transforming the required periodical withdrawal from the regeneration zone to a continuous feed of the reduction or hydrotreatment zone. Similarly, when the reduction or hydrotreatment of the regenerated catalyst is performed in fixed bed, in zones 15 of the figures, these figures do not show the required accessory devices for continuously driving the catalyst discharged from zone 15 towards the sulfurization zone.

What we claim is:

1. In a process for hydroreforming of hydrocarbons or for the production of aromatic hydrocarbons at a temperature from 480° to 600° C., in the presence of a catalyst, wherein an initial charge of hydrocarbons and hydrogen is passed through at least two reaction zones, arranged in series, each of said reaction zones being of the moving bed type, the charge passing successively through each reaction zone and the catalyst also continuously flowing downwardly successively through each reaction zone, as a moving bed, said catalyst continuously withdrawn from the bottom of the last reaction zone through which passes the charge, being fed to a regeneration zone, the improvement in said process comprising steps wherein:
   (a) the regenerated catalyst flows down into a storage-reduction zone, separate from the reaction zone, where it is reduced in the presence of substantially pure hydrogen, at a temperature from 480° to 530° C. and lower than the reaction temperature,
   (b) the regenerated and reduced catalyst flows continuously into a first enclosure wherein is injected, on the one hand, a sulfur compound and, on the other hand, a substantially pure hydrogen stream used for continuously raising the regenerated and reduced catalyst to a second enclosure above the first reaction zone wherethrough passes the charge and separate from said reaction zone, the catalyst then continuously flowing from said second enclosure to the first reaction zone, said regenerated and reduced catalyst being subjected, by means of the sulfur compound injected in the first enclosure, during its continuous flow from said first enclosure to said first reaction zone, to a sulfurization conducted at a temperature lower than 400° C. and at least 80° C. less than the temperature at which the regenerated catalyst is reduced.

2. A process according to claim 1, wherein the sulfurization temperature is from 280° to 380° C.

3. A process according to claim 1 wherein, in addition, the reduction zone is heated by indirect contact with a portion of the initial charge or of the reaction effluent amounting to about 1 to 5% by weight of the total initial charge or of the total initial reaction effluent.

4. In a process for hydroreforming of hydrocarbons or for the production of aromatic hydrocarbons conducted at a temperature from 480° to 600° C., in the presence of a catalyst, wherein an initial charge of hydrocarbons and hydrogen is passed through at least two reaction zones, arranged in series, each of said reaction zone being of the moving bed type, the charge passing successively through each reaction zone and the catalyst also continuously flowing downwardly successively through each reaction zone as a moving bed, said catalyst, continuously withdrawn from the bottom of the last reaction zone through which passes the charge, being fed to a regeneration zone, the improvement in said process comprising the steps wherein:
   (a) the regenerated catalyst flows down into a storage-reduction zone separate from the reaction zone, where it is reduced in the presence of substantially pure hydrogen, at a temperature from 480° to 530° C. and lower than the reaction temperature.
   (b) the regenerated and reduced catalyst continuously flows down into a first enclosure wherein is injected a sulfur compound, the regenerated and reduced catalyst flowing continuously from said first enclosure to a second enclosure located above the first reaction zone, through which passes the charge and separate from said reaction zone, the catalyst then flowing continuously from said second enclosure to the first reaction zone, said regenerated and reduced catalyst being subjected, by means of the sulfur compound injected in said first enclosure and during its continuous flow from said first enclosure to said first reaction zone, to a sulfurization conducted at a temperature lower than 400° C. and at least 80° C. less than the temperature at which the regenerated catalyst is reduced.

5. A process according to claim 4, wherein the sulfurization temperature is from 280° to 380° C.

6. A process according to claim 4, wherein, in addition, the reduction zone is heated by indirect contact with a portion of the initial charge or the reaction effluent amounting to about 1 to 5% by weight of the total initial charge or of the total initial reaction effluent.

7. In a process for reforming of hydrocarbons or for the production of aromatic hydrocarbons, at a temperature from 480° to 600° C., in th presence of a catalyst, wherein an initial charge of hydrocarbons and hydrogen is passed through at least two reaction zones, arranged in series and substantially vertical, each of said reaction zones being of the moving bed type, the charge passing suggessively through each reaction zone and the catalyst also continuously flowing downwardly successively through each reaction zone as a moving bed, the catalyst withdrawn continuously from the bottom of the last reaction zone through which passes the charge, being fed to a regeneration zone, the improvement in said process comprising the steps wherein:
   (a) the regenerated catalyst flows down in a hydrotreatment zone, separate from the reaction zone, where it is treated with hydrogen so as to undergo partial reduction, at a temperature from 380° to 445° C.,
   (b) the regenerated and hydrotreated catalyst flows down continuously in a first enclosure wherein is injected, on the one hand, a sulfur compound, and on the other hand, a hydrogen stream used for continuously raising the regenerated and hydrotreated catalyst to a second enclosure, located above the first reaction zone through which passes the charge and separate from said reaction zone, the catalyst then flowing continuously from said second enclosure to the first reaction zone, said regenerated and hydrotreated catalyst being subjected, by means of the sulfur compound injected in said first enclosure and during its continuous flow from said first enclosure to the first reaction zone, to a sulfurization conducted at a temperature from 200° to 390° C., and at least 50° C. less than the temperature at which is conducted the hydrotreatment.

8. A process according to claim 7, wherein the hydrogen used for driving the regenerated and hydrotreated catalyst to said second enclosure and the hydrogen used for the hydrotreatment of the regenerated catalyst is hydrogen from the unit.

9. In a process, for the reforming of hydrocarbons or for the production of aromatic hydrocarbons, at a temperature from 480° to 600° C., in the presence of a catalyst, wherein an initial charge of hydrocarbons and hydrogen is passed through at least two reaction zones, arranged in series, each of said reaction zones being of the moving bed type, the charge successively passing through each reaction zone and the catalyst also continuously flowing downwardly successively through each reaction zone as a moving bed, the catalyst continuously withdrawn from the bottom of the last reaction zone through which passes the charge, being fed to the regeneration zone, the improvement in said process comprising the steps wherein:
  (a) the regenerated catalyst flows down in a hydrotreatment zone, separate from the reaction zone, where it is treated with hydrogen to undergo a partial reduction at a temperature from 380° to 445° C.,
  (b) the regenerated and hydrotreated catalyst flows down continuously in a first enclosure where is injected a sulfur compound, the regenerated and hydrotreated catalyst flowing continuously from the first enclosure to a second enclosure located above the first reaction zone through which passes the charge and separate from said reaction zone, the catalyst then flowing continuously from said second enclosure to the first reaction zone, said regenerated and hydrotreated catalyst being subjected, by means of the sulfur compound injected in the first enclosure and during its continuous flow from said first enclosure to said first reaction zone, to a sulfurization conducted at a temperature from 200° to 390° C., and at least 50° C. less than the temperature at which is conducted the hydrotreatment.

10. A process according to claim 9, wherein the hydrogen used for the hydrotreatment of the regenerated catalyst is hydrogen from the unit.

11. A process according to claim 7, for the reforming, in the presence of a catalyst containing an alumina carrier and by weight with respect to the alumina carrier:
  (a) 0.2 to 0.4% of a first metal selected from platinum, iridium, ruthenium and rhodium,
  (b) 0.02 to 0.07% of a second metal, different from the first metal, selected from iridium and rhodium,
  (c) 0.25 to 0.55% of at least one third metal selected from copper, silver, gold, titanium, niobium, indium, thallium, manganese, germanium, tin, lead and rhenium and,
  (d) 0.1 to 10% of halogen.

12. A process according to claim 7, for the production of highly pure aromatic hydrocarbons, in the presence of a catalyst containing an alumina carrier and, by weight with respect to the alumina carrier:
  (a) 0.45 to 0.65% of a first metal selected from platinum, iridium and rhodium,
  (b) a second metal, different from the first metal and selected from iridium, rhodium, ruthenium, palladium, osmium and rhenium,
  (c) a third metal selected from copper, silver, gold, manganese, titanium, niobium, thallium, cadmium and indium and,
  (d) 0.1 to 10% of halogen.

13. A process according to claim 9, for the reforming, in the presence of a catalyst containing an alumina carrier and, by weight with respect to the alumina carrier:
  (a) 0.2 to 0.4% of a first metal selected from platinum, iridium, ruthenium and rhodium,
  (b) 0.02 to 0.7% of a second metal, different from the first metal and selected from iridium and rhodium,
  (c) 0.25 to 0.55% of at least one third metal selected from copper, silver, gold, titanium, niobium, indium, thallium, manganese, germanium, tin, lead and rhenium and,
  (d) 0.1 to 10% of halogen.

14. A process according to claim 9, for the production of highly pure aromatic hydrocarbons, in the presence of a catalyst containing an alumina carrier and, by weight with respect to the alumina carrier:
  (a) 0.45 to 0.65% of a first metal selected from platinum, iridium and rhodium,
  (b) a second metal, different from the first metal and selected from iridium, rhodium, ruthenium, palladium, osmium and rhenium,
  (c) a third metal selected from copper, silver, gold, manganese, titanium, niobium, thallium, cadmium and indium and,
  (d) 0.1 to 10% of halogen.

15. In a process for reforming hydrocarbons or for producing aromatic hydrocarbons, in the presence of a catalyst, at a temperature from 480° to 600° C., wherein an initial charge of hydrocarbons and hydrogen is passed through at least two reaction zones, arranged in series, each of said reaction zones being of the moving bed type, the charge passing successively through each reaction zone, and the catalyst also continuously flowing downwardly successively through each reaction zone as a moving bed, said catalyst continuously withdrawn from the bottom of the last reaction zone through which passes the charge, being fed to a regeneration zone, the improvement in said process comprising the steps wherein:
  (a) the regenerated catalyst flows down in a hydrotreatment zone, separate from the reaction zone, where it is treated by the purified unit hydrogen, at a temperature from 320° to 370° C., the catalyst flowing through said zone as a moving bed,
  (b) the regenerated catalyst, after this hydrotreatment, before being fed back to the first reaction zone, continuously flows down in a first enclosure wherein is injected, on the one hand, a sulfur compound and, on the other hand, a hydrogen stream used to continuously raise the regenerated and hydrotreated catalyst to a second enclosure located above the first reaction zone through which passes the charge, the catalyst then flowing continuously from said second enclosure to the first reaction zone, said regenerated and hydrotreated catalyst being subjected, by means of the sulfur compound injected in the first enclosure and during its continuous flow from said first enclosure to said first reaction zone, to a sulfurization conducted at a temperature from 200° to 280° C. and 70°–130° C. less than the hydrotreatment temperature.

16. A process according to claim 15, wherein the hydrotreatment is performed by means of purified unit hydrogen flowing counter-currently with respect to the catalyst flow in said hydrotreatment zone.

17. A process according to claim 15, wherein sulfurization is conducted in the range of about 220°–280° C.

18. A process according to claim 15, wherein the used catalyst withdrawn from the bottom of the last reaction zone through which passes the charge before or during its passage through the regeneration zone is first cleaned up by scavenging with at least a portion of said purified unit hydrogen.

19. In a process for reforming of hydrocarbons or for the production of aromatic hydrocarbons, in the presence of a catalyst, at a temperature from 480° to 600° C., wherein an initial charge of hydrocarbons and hydrogen is passed through at least two reaction zones, arranged in series, each reaction zone being of the moving bed type, the charge passing successively through each reaction zone and the catalyst also continuously flowing downwardly successively through each restriction zone as a moving bed, the catalyst, withdrawn continuously from the bottom of the last reaction zone through which passes the charge, being fed to a regeneration zone, the improvement in said process comprising the steps wherein:
  (a) the regenerated catalyst flows down in a hydrotreatment zone, separate from the reaction zone, where it is treated with purified unit hydrogen, at a temperature from 320° to 370° C., the catalyst flowing through said zone as a moving bed,
  (b) the regenerated and hydrotreated catalyst, before being fed back to the first reaction zone, continuously flows down in a first enclosure wherein is injected a sulfur compound, the regenerated and hydrotreated catalyst flowing continuously from said first enclosure to a second enclosure located above the first reaction zone through which passes the charge, the catalyst then flowing continuously from said second enclosure to the first reaction zone, said regenerated and hydrotreated catalyst being subjected, by means of the sulfur compound injected in the first enclosure and during its continuous flow from the first enclosure to the first reaction zone, to a sulfurization conducted at a temperature from 200° to 280° C. and 70°–130° C. less than the hydrotreatment temperature.

20. A process according to claim 19 wherein the hydrotreatment is performed by means of purified unit hydrogen, flowing counter-currently with respect to the catalyst flow in said hydrotreatment zone.

21. A process according to claim 19, wherein sulfurization is conducted at about 220°–280° C.

22. A process according to claim 19, wherein the used catalyst withdrawn from the bottom of the last reaction zone through which passes the charge, before or during its passage through the regeneration zone, is first cleaned by scavenging with at least a portion of said purified unit hydrogen.

23. In a process for reforming of hydrocarbons or for the production of aromatic hydrocarbons, at a temperature from 480° to 600° C., in the presence of a catalyst, wherein the charge is passed through at least two reaction zones, arranged in series and substantially vertical, each of said reaction zones being of the moving bed type, the charge passing successively through each reaction zone and the catalyst also continuously flowing downwardly successively through each reaction zone as a moving bed, the catalyst, withdrawn continuously from the bottom of the last reaction zone through which passes the charge, being fed to a regeneration zone, the improvement in said process comprising the steps wherein:
  (a) the regenerated catalyst flows down in a hydrotreatment zone, separate from the reaction zone, where it is treated with hydrogen so as to undergo partial reduction, at a temperature from 150° to 290° C.,
  (b) the regenerated and hydrotreated catalyst flows down continuously in a first enclosure wherein is injected, on the one hand, a sulfur compound, and on the other hand, a hydrogen stream used for continuously raising the regenerated and hydrotreated catalyst to a second enclosure, located above the first reaction zone through which passes the charge and separate from said reaction zone, the catalyst then flowing continuously from said second enclosure to the first reaction zone, said regenerated and hydrotreated catalyst being subjected, by means of the sulfur compound injected in said first enclosure and during its continuous flow from said first enclosure to the first reaction zone, to a sulfurization conducted at a temperature from 200° to 390° C.

24. A process according to claim 23, wherein the hydrogen used for driving the regenerated and hydrotreated catalyst to said second enclosure and the hydrogen used for the hydrotreatment of the regenerated catalyst is hydrogen from the unit.

25. A process for the reforming of hydrocarbons or for the production of aromatic hydrocarbons, at a temperature from 480° to 600° C., in the presence of a catalyst, wherein an initial charge of hydrocarbons and hydrogen is passed through at least two reaction zones, arranged in series, each of said reaction zones being of the moving bed type, the charge successively passing through each reaction zone and the catalyst also continuously flowing downwardly successively through each reaction zone as a moving bed, the catalyst continuously withdrawn from the bottom of the last reaction zone through which passes the charge, being fed to the regeneration zone, the improvement in said process comprising the steps wherein:
  (a) the regenerated catalyst flows down in a hydrotreatment zone, separate from the reaction zone, wherein it is treated with hydrogen to undergo a partial reduction at a temperature from 150° to 290° C.,
  (b) the regenerated and hydrotreated catalyst flows down continuously in a first enclosure where is injected a sulfur compound, the regenerated and hydrotreated catalyst flowing continuously from the first enclosure to a second enclosure located above the first reaction zone through which passes the charge and separate from said reaction zone, the catalyst then flowing continuously from said second enclosure to the first reaction zone, said regenerated and hydrotreated catalyst being subjected, by means of the sulfur compound injected in the first enclosure and during its continuous flow from said first enclosure to said first reaction zone, to a sulfurization conducted at a temperature from 200° to 390° C.

26. A process according to claim 25, wherein the hydrogen used for the hydrotreatment of the regenerated catalyst is hydrogen from the unit.

27. A process according to claim 23, for the reforming, in the presence of a catalyst containing an alumina carrier and by weight with respect to the alumina carrier:
    (a) 0.2 to 0.4% of a first metal selected from platinum, iridium, ruthenium and rhodium,
    (b) 0.02 to 0.07% of a second metal, different from the first metal, selected from iridium and rhodium,
    (c) 0.25 to 0.55% of at least one third metal selected from copper, silver, gold, titanium, niobium, indium, thallium, manganese, germanium, tin, lead and rhenium and,
    (d) 0.1 to 10% of halogen.

28. A process according to claim 23, for the production of higly pure aromatic hydrocarbons, in the presence of a catalyst containing an alumina carrier and, by weight with respect to the alumina carrier:
    (a) 0.45 to 0.65% of a first metal selected from platinum, iridium and rhodium,
    (b) a second metal, different from the first metal and selected from iridium, rhodium, ruthenium, palladium, osmium and rhenium,
    (c) a third metal selected from copper, silver, gold, manganese, titanium, niobium, thallium, cadmium and indium and,
    (d) 0.1 to 10% of halogen.

29. A process according to claim 25, for the reforming, in the presence of a catalyst containing an alumina carrier and, by weight with respect to the alumina carrier:
    (a) 0.2 to 0.4% of a first metal selected from platinum, iridium, ruthenium and rhodium,
    (b) 0.02 to 0.07% of a second metal, different from the first metal and selected from iridium and rhodium,
    (c) 0.25 to 0.55% of at least one third metal selected from copper, silver, gold, titanium, niobium, indium, thallium, manganese, germanium, tin, lead and rhenium and,
    (d) 0.1 to 10% of halogen.

30. A process according to claim 25 for the production of highly pure aromatic hydrocarbons, in the presence of a catalyst containing an alumina carrier and, by weight with respect to the alumina carrier:
    (a) 0.45 to 0.65% of a first metal selected from platinum, iridium and rhodium,
    (b) a second metal, different from the first metal and selected from iridium, rhodium, ruthenium, palladium, osmium and rhenium,
    (c) a third metal selected from copper, silver, gold, manganese, titanium, niobium, thallium, cadmium and indium and,
    (d) 0.1 to 10% of halogen.

* * * * *